US012628090B2

(12) United States Patent
Moses et al.

(10) Patent No.: US 12,628,090 B2
(45) Date of Patent: May 12, 2026

(54) POWER CONSUMPTION SAVINGS BASED ON CHANNEL DELAY SPREAD REPORTING

(71) Applicant: QUALCOMM Incorporated, San Diego, CA (US)

(72) Inventors: Amit Moses, Tel Aviv (IL); Ronen Shaked, Kfar Saba (IL); Yaniv Eistein, Tel Aviv (IL); Aviv Regev, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 18/495,347

(22) Filed: Oct. 26, 2023

(65) Prior Publication Data

US 2025/0142482 A1     May 1, 2025

(51) Int. Cl.
*H04W 52/24*      (2009.01)
*H04W 52/14*      (2009.01)
*H04W 52/26*      (2009.01)

(52) U.S. Cl.
CPC ....... *H04W 52/241* (2013.01); *H04W 52/143* (2013.01); *H04W 52/262* (2013.01)

(58) Field of Classification Search
None
See application file for complete search history.

(56) References Cited

U.S. PATENT DOCUMENTS

| | | | | |
|---|---|---|---|---|
| 6,281,835 B1 * | 8/2001 | Mast | ....................... | H03F 3/211 |
| | | | | 342/202 |
| 7,583,620 B2 * | 9/2009 | Jeon | ...................... | H04W 52/04 |
| | | | | 370/468 |
| 8,902,830 B2 * | 12/2014 | Nimbalker | ........ | H04W 52/0206 |
| | | | | 370/329 |
| 8,976,852 B2 * | 3/2015 | Huang | .............. | H04L 25/03057 |
| | | | | 375/348 |

(Continued)

FOREIGN PATENT DOCUMENTS

| | | | | |
|---|---|---|---|---|
| EP | 4395403 A1 * | 7/2024 | ............. | H04B 7/022 |
| EP | 4440204 A1 | 10/2024 | | |

(Continued)

OTHER PUBLICATIONS

International Search Report and Written Opinion—PCT/US2024/051279—ISA/EPO—Jan. 27, 2025 (2307068WO).

*Primary Examiner* — Hai V Nguyen
(74) *Attorney, Agent, or Firm* — Holland & Hart LLP

(57)     ABSTRACT

Methods, systems, and devices for wireless communications are described. A network entity may indicate to a user equipment (UE) (e.g., in a downlink control message) a capability of the network entity to disable power amplifiers for downlink transmissions. In response to the capability indication, the UE may estimate and report to the network entity the delay spread and antenna array loss threshold of a downlink signal. Based on the reported delay spread and antenna array loss threshold, the network entity may determine a quantity of power amplifiers that may be disabled for (Continued)

downlink transmission without reducing the received signal power at the UE below a minimum threshold. The power amplifiers that the network entity disables may be the power amplifiers with input powers less than a threshold (e.g., less than a highest input power by a threshold).

30 Claims, 15 Drawing Sheets

(56)                    References Cited

U.S. PATENT DOCUMENTS

| | | | | |
|---|---|---|---|---|
| 9,628,311 | B2 * | 4/2017 | Bertrand | H04L 25/022 |
| 9,667,334 | B2 * | 5/2017 | Xi | H04B 7/0671 |
| 9,924,381 | B2 * | 3/2018 | Siomina | H04W 64/00 |
| 9,935,699 | B2 * | 4/2018 | Kim | H04B 7/0452 |
| 10,476,563 | B2 * | 11/2019 | Stirling-Gallacher | |
| | | | | H04W 16/28 |
| 11,283,169 | B2 * | 3/2022 | Uyeno | G01S 13/89 |
| 11,570,600 | B2 * | 1/2023 | Gilson | H04W 4/80 |
| 11,632,284 | B2 * | 4/2023 | Lincoln | H04B 7/06956 |
| | | | | 370/328 |
| 11,647,459 | B2 * | 5/2023 | Islam | H04W 52/0212 |
| | | | | 370/311 |
| 11,737,025 | B2 * | 8/2023 | Yang | H04W 52/0216 |
| | | | | 370/318 |
| 11,811,563 | B2 * | 11/2023 | Ratnam | H04L 27/2649 |
| 11,870,347 | B2 * | 1/2024 | Davis-Marsh | H02M 1/0009 |
| 11,881,387 | B2 * | 1/2024 | Verenchikov | H01J 49/005 |
| 11,997,600 | B2 * | 5/2024 | Akl | H04W 52/0229 |
| 12,010,619 | B2 * | 6/2024 | Zhou | H04W 52/0229 |
| 12,069,649 | B2 * | 8/2024 | Myung | H04W 72/1268 |
| 12,224,885 | B1 * | 2/2025 | Bar-Or Tillinger | |
| | | | | H04W 72/1273 |
| 12,273,161 | B2 * | 4/2025 | Caporal Del Barrio | |
| | | | | H04B 7/0426 |
| 12,316,480 | B2 * | 5/2025 | Regev | H04L 25/0242 |
| 12,500,793 | B2 * | 12/2025 | Tsui | H04L 25/0222 |
| 2005/0122912 | A1 * | 6/2005 | Jeon | H04W 52/04 |
| | | | | 370/465 |
| 2005/0259724 | A1 * | 11/2005 | Bergstrom | H04B 1/7075 |
| | | | | 375/150 |
| 2011/0076964 | A1 * | 3/2011 | Dottling | H04W 52/0206 |
| | | | | 455/68 |
| 2012/0015657 | A1 * | 1/2012 | Comsa | H04L 5/0048 |
| | | | | 455/456.6 |
| 2012/0163305 | A1 * | 6/2012 | Nimbalker | H04W 52/0206 |
| | | | | 370/329 |
| 2013/0208704 | A1 * | 8/2013 | Hultell | H04W 16/28 |
| | | | | 370/335 |
| 2014/0204991 | A1 * | 7/2014 | Huang | H03M 13/6331 |
| | | | | 375/232 |
| 2014/0269492 | A1 * | 9/2014 | Forenza | H04B 7/0452 |
| | | | | 370/328 |
| 2014/0269493 | A1 * | 9/2014 | Forenza | H04B 7/0452 |
| | | | | 370/328 |

| | | | | |
|---|---|---|---|---|
| 2014/0269502 | A1 * | 9/2014 | Forenza | H04B 7/0452 |
| | | | | 370/328 |
| 2015/0215793 | A1 * | 7/2015 | Siomina | H04W 64/00 |
| | | | | 455/456.1 |
| 2015/0236882 | A1 * | 8/2015 | Bertrand | H04L 25/0228 |
| | | | | 370/329 |
| 2016/0134352 | A1 * | 5/2016 | Stirling-Gallacher | |
| | | | | H04W 16/28 |
| | | | | 370/329 |
| 2016/0182138 | A1 * | 6/2016 | Xi | H04B 7/0456 |
| | | | | 375/267 |
| 2016/0249364 | A1 * | 8/2016 | Siomina | H04W 16/32 |
| 2020/0067615 | A1 * | 2/2020 | Ghanbarinejad | H04B 7/06968 |
| 2020/0145062 | A1 * | 5/2020 | Jung | H04W 72/23 |
| 2021/0167996 | A1 * | 6/2021 | Ratnam | H04B 7/0617 |
| 2021/0204216 | A1 * | 7/2021 | Yang | H04W 52/0274 |
| 2021/0210330 | A1 * | 7/2021 | Verenchikov | H01J 49/005 |
| 2021/0211957 | A1 * | 7/2021 | Kamohara | H04W 36/085 |
| 2021/0352580 | A1 * | 11/2021 | Zhou | H04W 52/0209 |
| 2022/0085908 | A1 * | 3/2022 | Shaked | H04L 27/2646 |
| 2022/0255778 | A1 * | 8/2022 | Paz | H04B 7/0632 |
| 2022/0279535 | A1 * | 9/2022 | Tsui | H04L 25/0222 |
| 2022/0352932 | A1 * | 11/2022 | Malek Mohammadi | |
| | | | | H04B 7/0632 |
| 2022/0399973 | A1 * | 12/2022 | Zhou | H04L 5/0078 |
| 2023/0189206 | A1 * | 6/2023 | Kim | H04W 76/28 |
| | | | | 455/458 |
| 2023/0209463 | A1 * | 6/2023 | Shih | H04W 52/0216 |
| | | | | 370/311 |
| 2023/0209532 | A1 * | 6/2023 | Zhou | H04W 72/121 |
| 2023/0246549 | A1 * | 8/2023 | Davis-Marsh | H02M 1/15 |
| | | | | 323/271 |
| 2023/0403051 | A1 * | 12/2023 | Regev | H04B 7/0456 |
| 2024/0064738 | A1 * | 2/2024 | Myung | H04W 16/14 |
| 2024/0179588 | A1 * | 5/2024 | Yuan | H04W 36/0072 |
| 2024/0267855 | A1 * | 8/2024 | Yuan | H04L 5/0057 |
| 2024/0405895 | A1 * | 12/2024 | Raghavan | H04B 17/12 |
| 2025/0038812 | A1 * | 1/2025 | Lin | H04B 7/0626 |
| 2025/0048487 | A1 * | 2/2025 | Li | H04W 76/28 |
| 2025/0055732 | A1 * | 2/2025 | Bar-Or | H04L 25/0254 |
| 2025/0062823 | A1 * | 2/2025 | Yan | H04B 7/15528 |
| 2025/0106756 | A1 * | 3/2025 | Kim | H04W 52/02 |
| 2025/0150309 | A1 * | 5/2025 | Regev | H04L 5/0094 |
| 2025/0279812 | A1 * | 9/2025 | Kim | H04W 52/0216 |

FOREIGN PATENT DOCUMENTS

| | | | | | |
|---|---|---|---|---|---|
| EP | | 4510466 | A1 * | 2/2025 | H04W 8/24 |
| WO | WO-2016025111 | A1 * | 2/2016 | | H04L 27/2636 |
| WO | WO-2019195426 | A1 * | 10/2019 | | H04L 25/0224 |
| WO | WO-2023081258 | A1 * | 5/2023 | | H04W 52/0216 |
| WO | WO-2023121059 | A1 | 6/2023 | | |
| WO | WO-2024054148 | A1 * | 3/2024 | | H04L 5/0053 |
| WO | WO-2024071838 | A1 * | 4/2024 | | H04L 5/005 |
| WO | WO-2024188470 | A1 * | 9/2024 | | H04W 52/028 |
| WO | WO-2024217657 | A1 * | 10/2024 | | H04L 5/0048 |
| WO | WO-2024242696 | A2 * | 11/2024 | | H04W 36/305 |

* cited by examiner

130

105

115

Network
Entity

Transceiver

1310

Antenna

1315

Communications
Manager

1320

Memory

Code

1330

1325

1340

Processor

1335

1305

1300

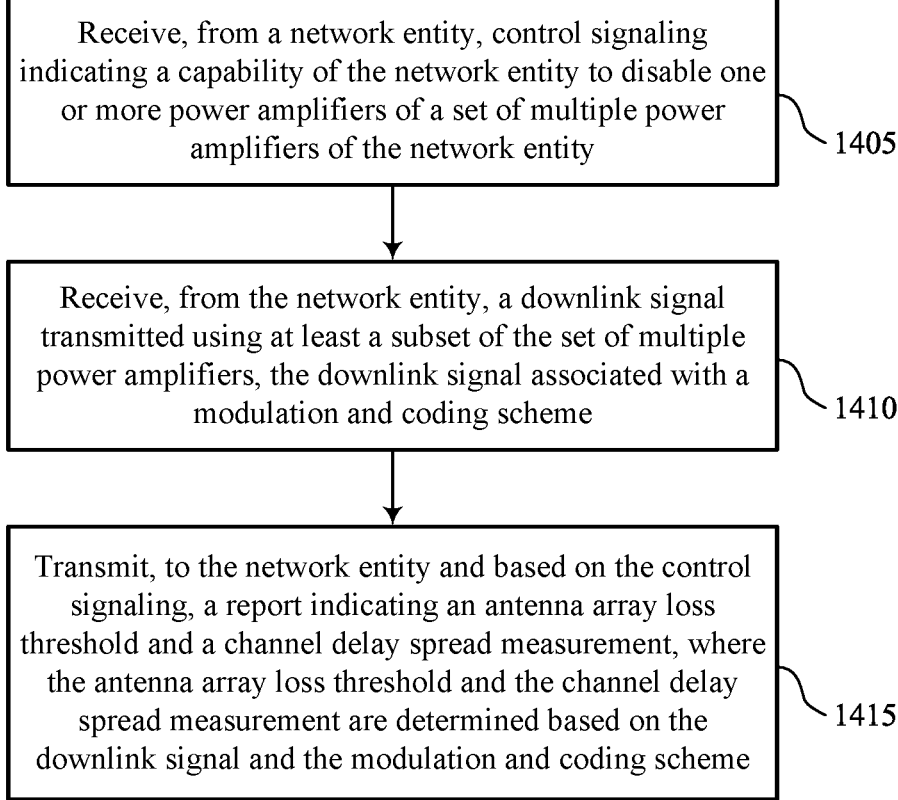

Receive, from a network entity, control signaling indicating a capability of the network entity to disable one or more power amplifiers of a set of multiple power amplifiers of the network entity

1405

Receive, from the network entity, a downlink signal transmitted using at least a subset of the set of multiple power amplifiers, the downlink signal associated with a modulation and coding scheme

1410

Transmit, to the network entity and based on the control signaling, a report indicating an antenna array loss threshold and a channel delay spread measurement, where the antenna array loss threshold and the channel delay spread measurement are determined based on the downlink signal and the modulation and coding scheme

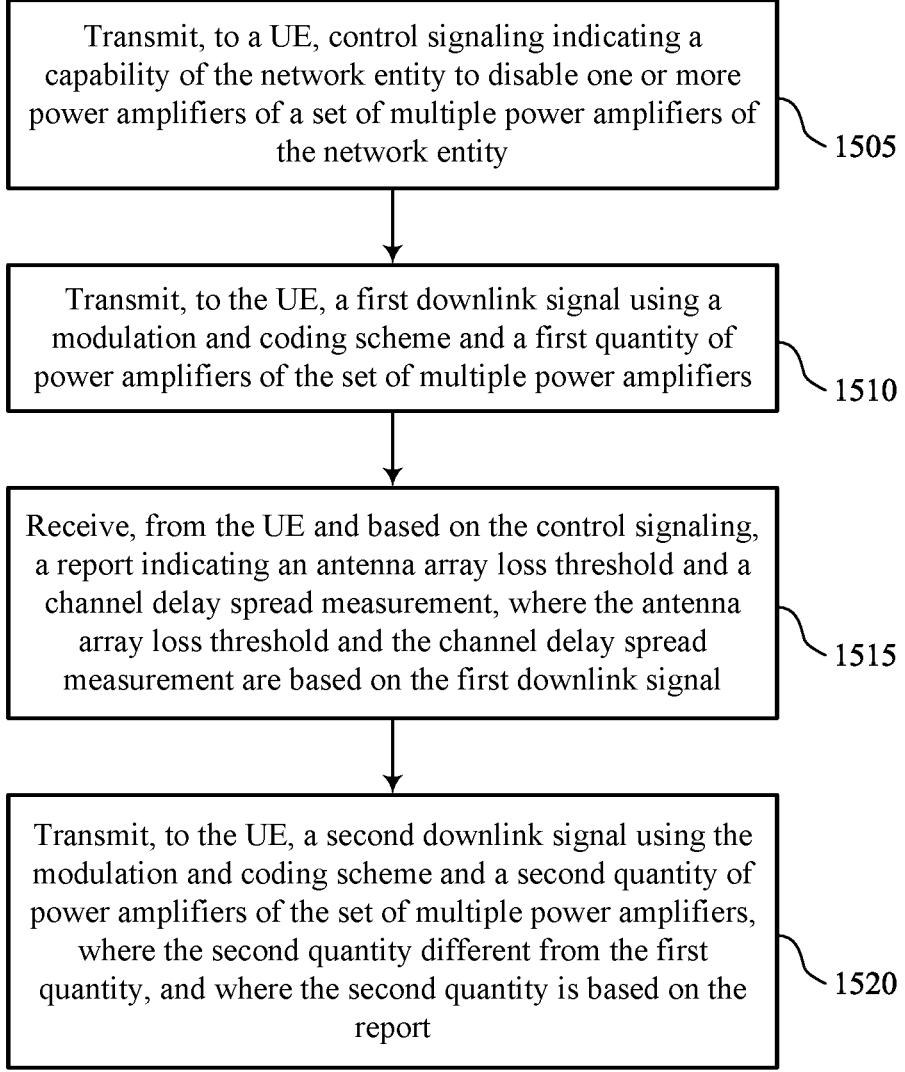

Transmit, to a UE, control signaling indicating a capability of the network entity to disable one or more power amplifiers of a set of multiple power amplifiers of the network entity ⟩ 1505

Transmit, to the UE, a first downlink signal using a modulation and coding scheme and a first quantity of power amplifiers of the set of multiple power amplifiers ⟩ 1510

Receive, from the UE and based on the control signaling, a report indicating an antenna array loss threshold and a channel delay spread measurement, where the antenna array loss threshold and the channel delay spread measurement are based on the first downlink signal ⟩ 1515

Transmit, to the UE, a second downlink signal using the modulation and coding scheme and a second quantity of power amplifiers of the set of multiple power amplifiers, where the second quantity different from the first quantity, and where the second quantity is based on the report ⟩ 1520

POWER CONSUMPTION SAVINGS BASED ON CHANNEL DELAY SPREAD REPORTING

FIELD OF TECHNOLOGY

The following relates to wireless communications, including power consumption savings based on channel delay spread reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support power consumption savings based on channel delay spread reporting. For example, the described techniques provide for network energy saving by disabling power amplifiers at a network entity based on user equipment (UE) reporting of delay spread and antenna array loss threshold. For example, a network entity may indicate to a UE (e.g., in a downlink control message) a capability of the network entity to disable power amplifiers for downlink transmissions. In response to the capability indication, the UE may measure and report to the network entity the delay spread or antenna array loss threshold of a downlink signal. Based on the reported delay spread or antenna array loss threshold, the network entity may determine a quantity of power amplifiers that may be disabled for downlink transmission without reducing the received signal power at the UE below a minimum threshold. The power amplifiers that the network entity disables may be the power amplifiers with input powers less than a threshold (e.g., less than a maximum input power by a threshold).

A method for wireless communications by a UE is described. The method may include receiving, from a network entity, control signaling indicating a capability of the network entity to disable one or more power amplifiers of a set of multiple power amplifiers of the network entity, receiving, from the network entity, a downlink signal transmitted using at least a subset of the set of multiple power amplifiers, the downlink signal associated with a modulation and coding scheme (MCS), and transmitting, to the network entity and based on the control signaling, a report indicating an antenna array loss threshold and a channel delay spread measurement, where the antenna array loss threshold and the channel delay spread measurement are determined based on the downlink signal and the MCS.

A UE for wireless communications is described. The UE may include one or more memories storing processor executable code, and one or more processors coupled with the one or more memories. The one or more processors may individually or collectively operable to execute the code to cause the UE to receive, from a network entity, control signaling indicating a capability of the network entity to disable one or more power amplifiers of a set of multiple power amplifiers of the network entity, receive, from the network entity, a downlink signal transmitted using at least a subset of the set of multiple power amplifiers, the downlink signal associated with an MCS, and transmit, to the network entity and based on the control signaling, a report indicating an antenna array loss threshold and a channel delay spread measurement, where the antenna array loss threshold and the channel delay spread measurement are determined based on the downlink signal and the MCS.

Another UE for wireless communications is described. The UE may include means for receiving, from a network entity, control signaling indicating a capability of the network entity to disable one or more power amplifiers of a set of multiple power amplifiers of the network entity, means for receiving, from the network entity, a downlink signal transmitted using at least a subset of the set of multiple power amplifiers, the downlink signal associated with an MCS, and means for transmitting, to the network entity and based on the control signaling, a report indicating an antenna array loss threshold and a channel delay spread measurement, where the antenna array loss threshold and the channel delay spread measurement are determined based on the downlink signal and the MCS.

A non-transitory computer-readable medium storing code for wireless communications is described. The code may include instructions executable by a processor to receive, from a network entity, control signaling indicating a capability of the network entity to disable one or more power amplifiers of a set of multiple power amplifiers of the network entity, receive, from the network entity, a downlink signal transmitted using at least a subset of the set of multiple power amplifiers, the downlink signal associated with an MCS, and transmit, to the network entity and based on the control signaling, a report indicating an antenna array loss threshold and a channel delay spread measurement, where the antenna array loss threshold and the channel delay spread measurement are determined based on the downlink signal and the MCS.

In some examples of the method, UEs, and non-transitory computer-readable medium described herein, the downlink signal may be a first downlink signal and the method, apparatuses, and non-transitory computer-readable medium may include further operations, features, means, or instructions for receiving, from the network entity and subsequent to transmission of the report, a second downlink signal associated with the MCS, where a received signal power of the second downlink signal may be based on the report.

Some examples of the method, UEs, and non-transitory computer-readable medium described herein may further include operations, features, means, or instructions for transmitting, to the network entity and based on the control signaling, a second report indicating a second antenna array loss threshold and a second channel delay spread measurement, where the report includes a first report, where the channel delay spread measurement includes a first channel delay spread measurement, where the antenna array loss threshold includes a first antenna array loss threshold, and where the second antenna array loss threshold and the second channel delay spread measurement may be determined based on the second downlink signal.

In some examples of the method, UEs, and non-transitory computer-readable medium described herein, the antenna array loss threshold may be determined based on a margin between a measured signal to noise ratio (SNR) of the downlink signal and a threshold SNR.

In some examples of the method, UEs, and non-transitory computer-readable medium described herein, receiving the control signaling may include operations, features, means, or instructions for receiving an indication of the MCS.

Some examples of the method, UEs, and non-transitory computer-readable medium described herein may further include operations, features, means, or instructions for receiving, from the network entity, a set of channel state information (CSI) reference signals (CSI-RSs) and transmitting, to the network entity, a channel state information report based on the set of CSI-RSs, where the MCS may be based on the CSI report.

In some examples of the method, UEs, and non-transitory computer-readable medium described herein, transmitting the report may include operations, features, means, or instructions for transmitting the report via an uplink control channel transmission.

In some examples of the method, UEs, and non-transitory computer-readable medium described herein, the downlink signal may be one of a downlink control channel transmission or a downlink shared channel transmission.

A method for wireless communications by a network entity is described. The method may include transmitting, to a UE, control signaling indicating a capability of the network entity to disable one or more power amplifiers of a set of multiple power amplifiers of the network entity, transmitting, to the UE, a first downlink signal using an MCS and a first quantity of power amplifiers of the set of multiple power amplifiers, receiving, from the UE and based on the control signaling, a report indicating an antenna array loss threshold and a channel delay spread measurement, where the antenna array loss threshold and the channel delay spread measurement are based on the first downlink signal, and transmitting, to the UE, a second downlink signal using the MCS and a second quantity of power amplifiers of the set of multiple power amplifiers, where the second quantity different from the first quantity, and where the second quantity is based on the report.

A network entity for wireless communications is described. The network entity may include one or more memories storing processor executable code, and one or more processors coupled with the one or more memories. The one or more processors may individually or collectively operable to execute the code to cause the network entity to transmit, to a UE, control signaling indicating a capability of the network entity to disable one or more power amplifiers of a set of multiple power amplifiers of the network entity, transmit, to the UE, a first downlink signal using an MCS and a first quantity of power amplifiers of the set of multiple power amplifiers, receive, from the UE and based on the control signaling, a report indicating an antenna array loss threshold and a channel delay spread measurement, where the antenna array loss threshold and the channel delay spread measurement are based on the first downlink signal, and transmit, to the UE, a second downlink signal using the MCS and a second quantity of power amplifiers of the set of multiple power amplifiers, where the second quantity different from the first quantity, and where the second quantity is based on the report.

Another network entity for wireless communications is described. The network entity may include means for transmitting, to a UE, control signaling indicating a capability of the network entity to disable one or more power amplifiers of a set of multiple power amplifiers of the network entity, means for transmitting, to the UE, a first downlink signal using an MCS and a first quantity of power amplifiers of the set of multiple power amplifiers, means for receiving, from the UE and based on the control signaling, a report indicating an antenna array loss threshold and a channel delay spread measurement, where the antenna array loss threshold and the channel delay spread measurement are based on the first downlink signal, and means for transmitting, to the UE, a second downlink signal using the MCS and a second quantity of power amplifiers of the set of multiple power amplifiers, where the second quantity different from the first quantity, and where the second quantity is based on the report.

A non-transitory computer-readable medium storing code for wireless communications is described. The code may include instructions executable by a processor to transmit, to a UE, control signaling indicating a capability of the network entity to disable one or more power amplifiers of a set of multiple power amplifiers of the network entity, transmit, to the UE, a first downlink signal using an MCS and a first quantity of power amplifiers of the set of multiple power amplifiers, receive, from the UE and based on the control signaling, a report indicating an antenna array loss threshold and a channel delay spread measurement, where the antenna array loss threshold and the channel delay spread measurement are based on the first downlink signal, and transmit, to the UE, a second downlink signal using the MCS and a second quantity of power amplifiers of the set of multiple power amplifiers, where the second quantity different from the first quantity, and where the second quantity is based on the report.

Some examples of the method, network entities, and non-transitory computer-readable medium described herein may further include operations, features, means, or instructions for determining, based on the antenna array loss threshold and the channel delay spread measurement, a third quantity of power amplifiers of the set of multiple power amplifiers to disable for the second downlink signal, where a difference between the first quantity and the second quantity may be the third quantity.

In some examples of the method, network entities, and non-transitory computer-readable medium described herein, transmitting the second downlink signal may include operations, features, means, or instructions for disabling a set of power amplifiers of the set of multiple power amplifiers having respective input powers less than a threshold for the second downlink signal, a quantity of power amplifiers of the set of power amplifiers being the third quantity.

In some examples of the method, network entities, and non-transitory computer-readable medium described herein, determining the third quantity may include operations, features, means, or instructions for identifying, based on the channel delay spread measurement, a lookup table and determining, based on the lookup table and the antenna array loss threshold, the third quantity.

Some examples of the method, network entities, and non-transitory computer-readable medium described herein may further include operations, features, means, or instructions for receiving, from the UE and based on the control signaling, a second report indicating a second antenna array loss threshold and a second channel delay spread measurement, where the channel delay spread measurement includes a first channel delay spread measurement, where the antenna array loss threshold includes a first antenna array loss threshold, and where the second antenna array loss threshold and the second channel delay spread measurement may be based on the second downlink signal.

In some examples of the method, network entities, and non-transitory computer-readable medium described herein, the antenna array loss threshold may be based on a margin between a measured SNR of the first downlink signal at the UE and a threshold SNR.

In some examples of the method, network entities, and non-transitory computer-readable medium described herein, transmitting the control signaling may include operations, features, means, or instructions for transmitting an indication of the MCS.

Some examples of the method, network entities, and non-transitory computer-readable medium described herein may further include operations, features, means, or instructions for transmitting a set of CSI-RSs and receiving, from the UE, a CSI report based on the set of CSI-RSs, where the MCS may be based on the CSI report.

In some examples of the method, network entities, and non-transitory computer-readable medium described herein, receiving the report may include operations, features, means, or instructions for receiving the report via an uplink control channel transmission.

In some examples of the method, network entities, and non-transitory computer-readable medium described herein, the first downlink signal may be one of a downlink control channel transmission or a downlink shared channel transmission.

BRIEF DESCRIPTION OF THE DRAWINGS

FIGS. 14 and 15 show flowcharts illustrating methods that support power consumption savings based on channel delay spread reporting in accordance with one or more aspects of the present disclosure.

DETAILED DESCRIPTION

In wireless communications systems, network entities may transmit downlink signals to user equipments (UEs). Power amplifiers are one of the most power intensive components of network entities. When transmitting downlink signals over a low number of layers over multiple antennas in accordance with a precoder, the power at the input of each transmission chain (e.g., power amplifier and antenna) may vary as the precoder may not uniformly distribute power along the transmission chain. For example, a singular value decomposition (SVD) precoder may rely on physical channel characteristics (based on channel state information (CSI) reporting) to divide power along the transmission chain. Delay spread may change from slot to slot or symbol to symbol, and may affect the signal to noise ratio (SNR) of a received downlink signal at a UE. As the coding scheme (e.g., the modulation and coding scheme (MCS)) may be determined based on a CSI report, there may be a margin between the actual SNR of a downlink signal and a minimum or threshold SNR for the UE to be able to receive and decode a downlink signal.

According to various aspects described herein, a network entity may disable some power amplifiers to reduce power consumption associated with downlink transmissions. The amount of power amplifiers the network entity may disable may be based on the delay spread and SNR margin (e.g., the antenna array loss threshold) determined at the UE. For example, the network entity may indicate to the UE (e.g., in a downlink control message) a capability of the network entity to disable power amplifiers for downlink transmissions. In response to the capability indication, the UE may measure and report to the network entity the delay spread or antenna array loss threshold, or both, of a downlink signal, such as a physical downlink control channel (PDCCH) transmission or a physical downlink shared channel (PDSCH) transmission. Based on the reported delay spread and antenna array loss threshold, the network entity may determine a quantity of power amplifiers that may be disabled for a downlink transmission without reducing the received signal power at the UE below a minimum threshold. The power amplifiers that the network entity disables may be the power amplifiers with input powers less than a threshold (e.g., less than a highest input power by a threshold).

Aspects of the disclosure are initially described in the context of wireless communications systems. Aspects of the disclosure are further illustrated by and described with reference to apparatus diagrams, system diagrams, and flowcharts that relate to power consumption savings based on channel delay spread reporting.

Figure 1:
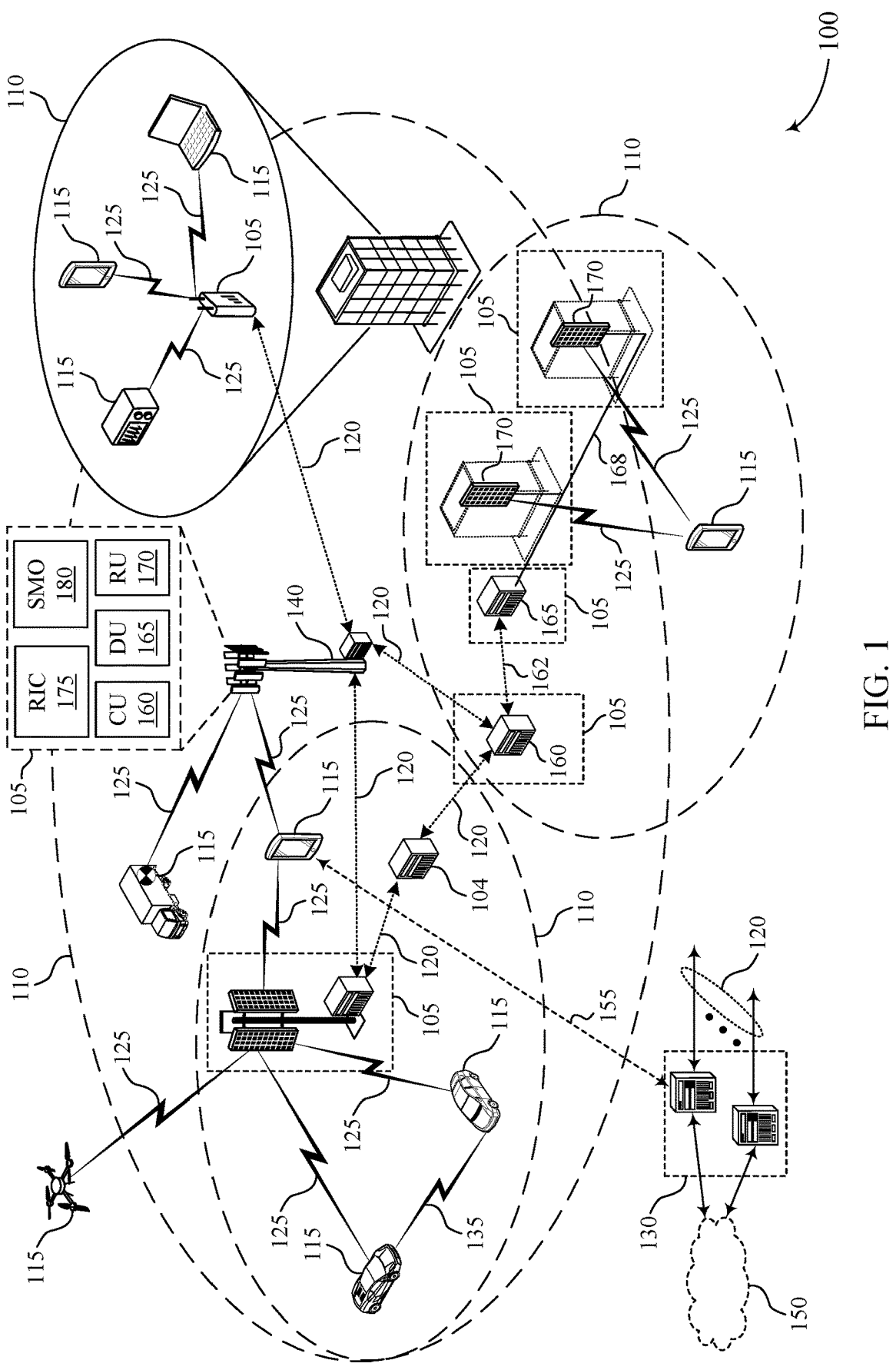
FIG. 1 shows an example of a wireless communications system that supports power consumption savings based on channel delay spread reporting in accordance with one or more aspects of the present disclosure.

FIG. 1 shows an example of a wireless communications system 100 that supports power consumption savings based on channel delay spread reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support power consumption savings based on channel delay spread reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers)

compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communi-cated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may implement techniques to reduce power consumption at UEs 115 and network entities 105. For example, UEs 115 and/or network entities may implement discontinuous reception (DRX) and/or discontinuous transmission (DTX) to reduce energy consumption. In some examples, the wireless communications system 100 may implement massive MIMO below 7 GHz frequency bands. In some examples, MIMO may be used in upper to mid spectrum bands, enabling broad coverage and increased capacity, for example, to support future generation networks. As bandwidth increases, however, network power consumption may increase and become more pronounced. The use of massive quantities of antenna elements to support massive MIMO may incorporate associated quantities of power amplifiers, which may be one of the most power-intensive components of network entities 105. Network entities 105, such as gNBs, may consume thousands of Watts, and a significant portion of the energy consumption of network entities 105 may be used by power amplifiers. Power amplifiers may have inefficiencies; for example power amplifiers may demand a fixed supply voltage regardless of the input voltage, or may draw current that is not proportional to the input voltage. The inefficiencies of power amplifiers may become more apparent at low input voltages.

When transmitting downlink signals over a low number of layers over multiple antennas in accordance with a precoder, the power at the input of each transmission chain (e.g., power amplifier and antenna) may vary as the precoder may not uniformly distribute power along the transmission chain. Delay spread may change from slot to slot or symbol to symbol, and may affect the SNR of a received downlink signal at a UE 115. For example, an SVD precoder may rely on physical channel characteristics (based on CSI reporting) to divide power along the transmission chain. As the MCS may be determined based on a CSI report, there may be a margin between the actual SNR of a downlink signal and a minimum or threshold SNR for the UE 115 to be able to receive and decode a downlink signal.

A network entity 105 may disable some power amplifiers to reduce power consumption associated with downlink transmissions. The amount of power amplifiers the network entity may disable may be based on the delay spread determined at the UE 115, the SNR margin (e.g., the antenna array loss threshold) determined at the UE 115, or both. For example, the network entity 105 may indicate to the UE 115 (e.g., in a downlink control message) a capability of the network entity 105 to disable power amplifiers for downlink transmissions. In response to the capability indication, the UE 115 may measure and report to the network entity 105 the delay spread, or the antenna array loss threshold, or both, of a downlink signal, such as a PDCCH transmission or a PDSCH transmission. Based on the reported delay spread or antenna array loss threshold, the network entity 105 may determine a quantity of power amplifiers that may be disabled for downlink transmission without reducing the received signal power at the UE 115 below a threshold. The power amplifiers that the network entity 105 disables may be the power amplifiers with input powers less than a threshold (e.g., less than a highest input power by a threshold).

In some examples, the network entity 105 may assume channel reciprocity and estimate the delay spread without feedback from the UE 115 (e.g., based on an uplink signal from the UE 115). However, the network entity 105 may not be able to estimate the SNR margin (e.g., the antenna array loss threshold) per slot or per symbol. As described herein, the network entity 105 may use the antenna array loss threshold to determine the quantity of antennas the network entity 105 can disable for a given downlink transmission, and thus UE 115 may estimate and report the delay spread or the antenna array loss per slot, per symbol, or per downlink transmission.

Figure 2:
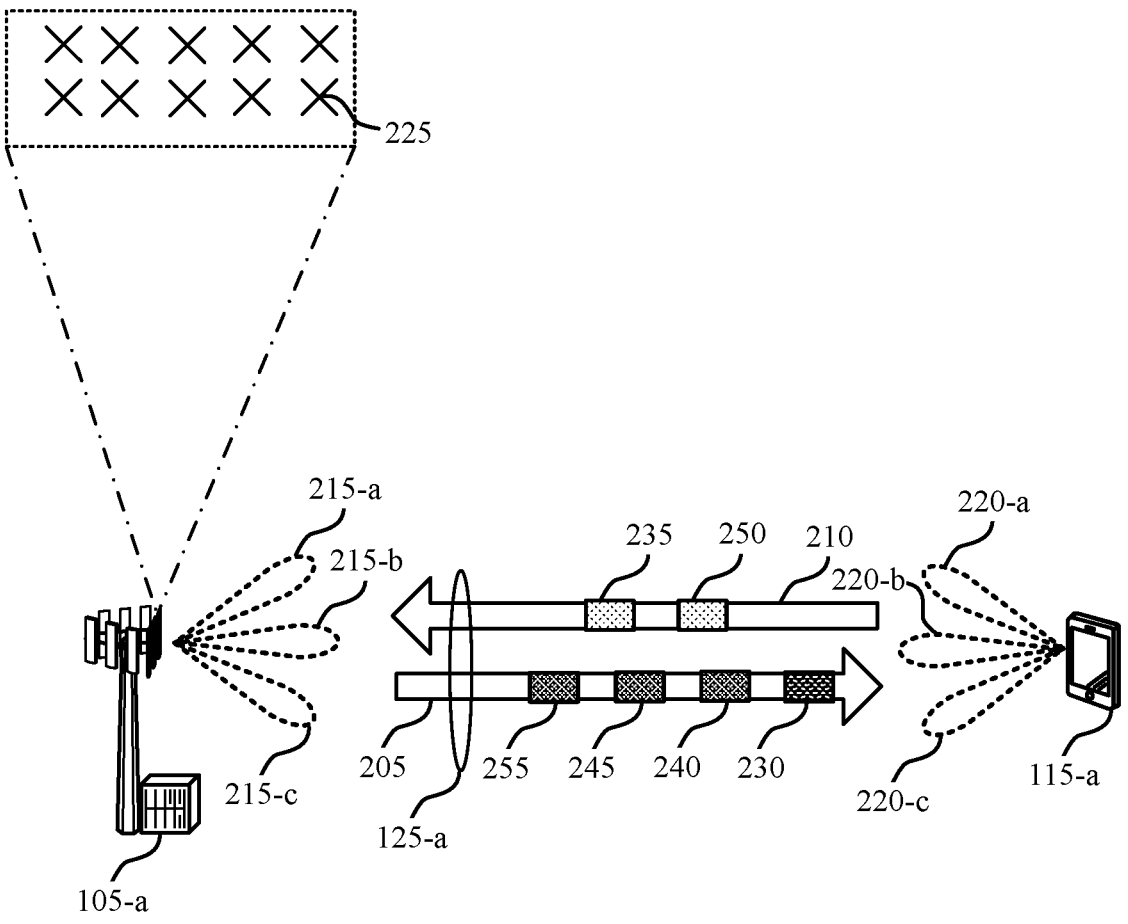
FIG. 2 shows an example of a wireless communications system that supports power consumption savings based on channel delay spread reporting in accordance with one or more aspects of the present disclosure.

FIG. 2 shows an example of a wireless communications system 200 that supports power consumption savings based on channel delay spread reporting in accordance with one or more aspects of the present disclosure. The wireless communications system 200 may implement or may be implemented by aspects of the wireless communications system 100. For example, the wireless communications system 200 may include a UE 115-a, which may be an example of a UE 115 as described herein. The wireless communications system 200 may include a network entity 105-a, which may be an example of a network entity 105 as described herein.

The UE 115-a may communicate with the network entity 105-a using a communication link 125-a. The communication link 125-a may be an example of an NR or LTE link between the UE 115-a and the network entity 105-a. The communication link 125-a may include a bi-directional link that enable both uplink and downlink communications. For example, the UE 115-a may transmit uplink signals 205 (e.g., uplink transmissions), such as uplink control signals or uplink data signals, to the network entity 105-a using the communication link 125-a and the network entity 105-a may transmit downlink signals 210 (e.g., downlink transmissions), such as downlink control signals or downlink data signals, to the UE 115-a using the communication link 125-a.

Figure 3:
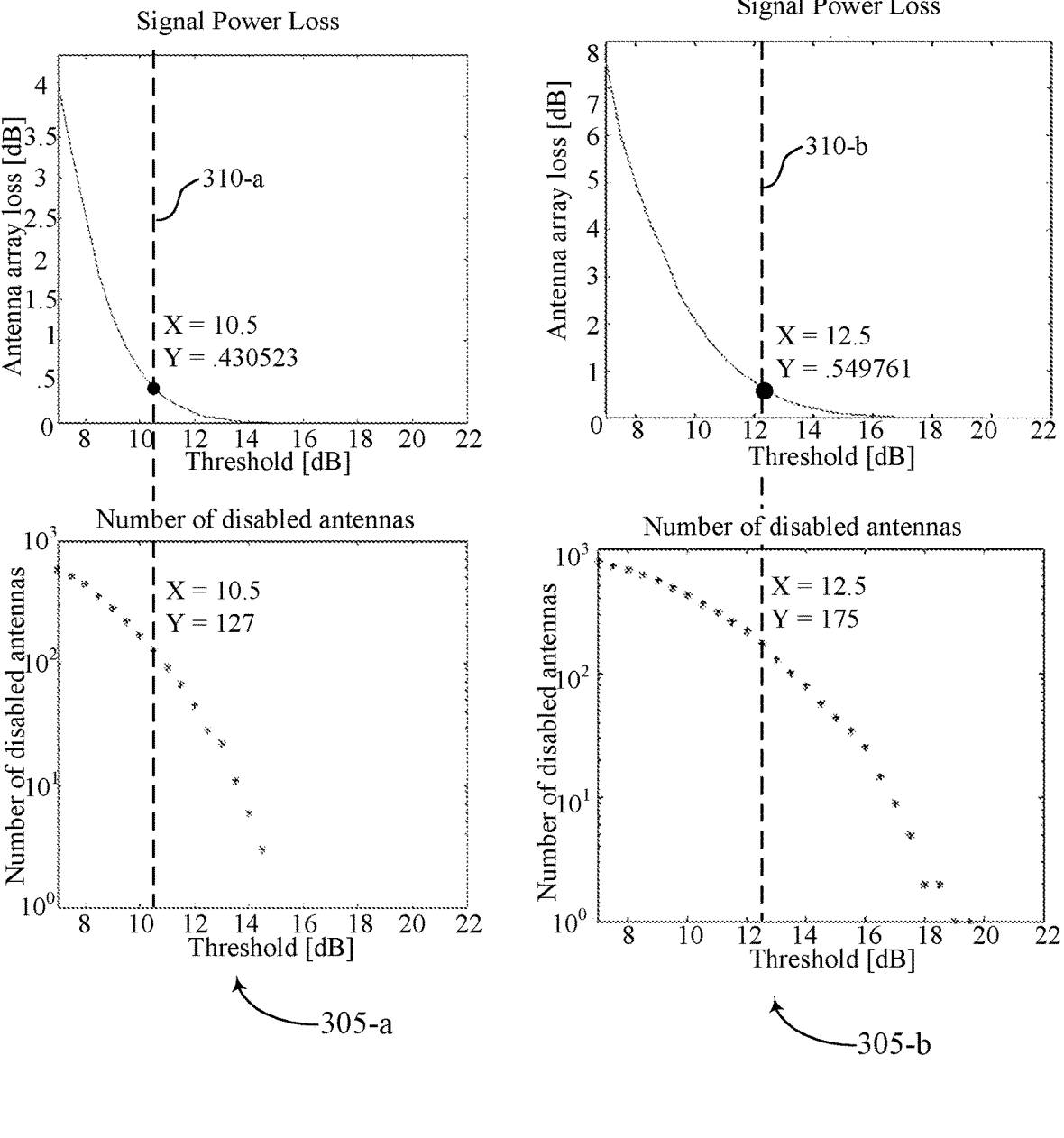
FIG. 3 shows an example of a method for determining a quantity of antennas to disable that supports power consumption savings based on channel delay spread reporting in accordance with one or more aspects of the present disclosure.

The network entity 105-a may transmit CSI-RSs 230. The UE 115-a may receive and measure the CSI-RSs 230. Based on the CSI-RSs 230, the UE may generate and transmit a CSI report 235 to the network entity 105-a. The network entity 105-a may use a quantity of antenna elements 225 to transmit the CSI-RSs 230. The network entity 105-a may use beamforming techniques to transmit the CSI-RSs 230 via a quantity of beams 215 (e.g., a beam 215-a, a beam 215-b, and a beam 215-c as shown in FIG. 3) using the quantity of antenna elements 225. The UE 115-a may receive the CSI-RSs 230 via a quantity of receive beams 220 (e.g., a beam 220-a, a beam 220-b, and a beam 220-c as shown in FIG. 3) at the UE 115-a. Based on the CSI report 235, the network entity 105-a may identify suitable configurations for communications with the UE 115-a (e.g., for communication of downlink signals 210 such as PDCCHs and PDSCHs). For example, based on the CSI report 235, the network entity 105-a may identify an MCS or a beam 215 for downlink communications with the UE 115-a.

In some examples, as described herein, the network entity 105-a may disable power amplifiers at the network entity 105-a to reduce energy consumption. For example, the network entity 105-a may transmit control signaling 240 indicating a capability of the network entity 105-a to disable power amplifiers at the network entity 105-a (e.g., based on delay spread reporting by the UE 115-a). For example, the control signaling 240 may be a PDCCH, a system information message, or RRC signaling.

The network entity 105-a may transmit a first downlink signal 245 to the UE 115-a using the MCS determined based on the CSI report 235. For example, the first downlink signal 245 may be a PDCCH or a PDSCH. Based on the first downlink signal 245, the UE 115-a may estimate a delay spread or an antenna array loss threshold. The UE 115-a may transmit a report 250 indicating the estimated delay spread, the antenna array loss threshold, or both. For example, the antenna array loss threshold may be indicative of how much the received signal power of the first downlink signal 245 could be reduced (e.g., the maximum receive power loss the UE 115-a may endure) while still enabling the UE 115-a to decode the first downlink signal 245. In some examples, the report 250 may be transmitted in an uplink control information (UCI) message such as via a physical uplink control channel (PUCCH).

Based on the estimated delay spread and the antenna array loss threshold indicated in the report 250, the network entity 105-a may determine how many power amplifiers may be disabled and the network entity 105-a may identify which power amplifiers to disable. The network entity 105-a may transmit a second downlink signal 255 that uses the same MCS as the first downlink signal 245 and using the reduced quantity of power amplifiers determined based on the estimated delay spread or the antenna array loss threshold indicated in the report 250. For example, the precoder used at the network entity 105-a may lead to different power inputs for each power amplifier at the network entity 105-a. As the channel between the network entity 105-a and the UE 115-a may not be flat, the precoding may vary over frequency, and as delay spread increases, the variation may become more rapid and significant. For a given antenna array loss threshold indicated by the UE 115-a, the network entity 105-a may determine which antenna element 225 has a highest power input (e.g., on average over frequency) and the quantity of antenna elements 225 which have a power input less than the maximum power input by at least a threshold quantity of dBs (e.g., on average over frequency). Accordingly, the network entity 105-a may disable the antenna elements 225 having a power input less than the highest power input by at least a threshold (e.g., in dBs).

Antenna array loss may be the reduction in received signal power at the UE 115-a based on the effective quantity of transmission antennas at the network entity 105-a that are disabled. For example, $E_0$ may be the received energy of an original signal without disabling any power amplifier, and E may be the energy of the signal with the disabled power amplifiers, where $$E_0 = \left| \sum_{i=1}^{N} H_i \cdot P_i \cdot X \right|^2 = \left| X \cdot \sum_{i=1}^{N} H_i \cdot P_i \right|^2$$

and $$E = \left| X \cdot \sum_{\substack{i=1, \\ i \neq \{disabled\, PA\}}}^{N} H_i \cdot P_i \right|^2.$$

The antenna array loss threshold, AAL, may accordingly be given by $$AAL = -10 \log\left(\frac{E}{E_0}\right) dBs.$$

The UE 115-a may report the antenna array loss threshold in the report 250, which indicates the maximum received power loss the UE 115-a would be able to endure for the first downlink signal 245 while still being able to decode the first downlink signal 245. Based on the reported delay spread and the reported antenna array loss threshold, the network entity 105-a may determine the quantity of antenna elements 225 the network entity 105-a may disable, for example, based on a look up table as described with reference to FIG. 3.

In some examples, the UE 115-a may report the estimated delay spread and antenna array loss threshold after each downlink transmission from the network entity 105-a (e.g., after the second downlink signal 255 and after subsequent downlink transmissions). The network entity 105-a may determine how many and which power amplifiers to disable for each downlink transmission to the UE 115-a based on the reported estimated delay spread and antenna array loss threshold. For example, the delay spread and the antenna array loss threshold may vary from slot to slot or symbol to symbol based on changing channel conditions, and thus the UE 115-a may report the estimated delay spread and antenna array loss threshold after each downlink transmission from the network entity 105-a.

In some examples, multiple UEs 115 may report antenna array loss thresholds and delay spreads, and the network entity 105-a may disable power amplifiers at the network entity for concurrent communications with the multiple UEs 115 based on the reported antenna array loss thresholds and delay spreads by the multiple UEs 115.

FIG. 3 shows an example of a method for determining a quantity of antennas to disable 300 that supports power consumption savings based on channel delay spread reporting in accordance with one or more aspects of the present disclosure. The method for determining a quantity of antennas to disable 300 may implement or may be implemented by aspects of the wireless communication system 100 or the wireless communications system 200.

As described herein, a network entity 105 may use a lookup table to determine the quantity of antennas to disable for a given reported delay spread or antenna array loss threshold. For example, the lookup table 305 may be selected based on the delay spread. For example, the network entity 105 may select the lookup table 305-a when the delay spread is 20 nanoseconds, and the network entity 105 may select the lookup table 305-b when the delay spread is 10 nanoseconds. In each of the lookup tables 305, the quantity of antennas at the network entity 105 may be 1024.

As shown in FIG. 3, when the reported delay spread is 20 nanoseconds, the lookup table 305-a shows that for a reported antenna array loss of 0.430523 dBs, the threshold transmission power reduction at the network entity 105 is 10.5 dBs, and as shown by the line 310-a, for the threshold power reduction of 10.5 dBs, the quantity of antennas that may be disabled is 127. Thus, the network entity 105 may disable 127/1024 antennas, which corresponds to 12.4% of the antenna elements and corresponding power amplifiers. Thus, at a delay spread of 20 nanoseconds for this particular example, the power consumption of the power amplifiers at the network entity 105 may be reduced by 12.4% while reducing SNR of the received signal at the UE 115 by 0.430523 SNR.

Similarly, as shown in FIG. 3, when the reported delay spread is 10 nanoseconds, the lookup table 305-b shows that for a reported antenna array loss of 0.549761 dBs, the threshold transmission power reduction at the network entity 105 is 12.5 dBs, and as shown by the line 310-b, for the threshold power reduction of 12.5 dBs, the quantity of antennas that may be disabled is 175. Thus, the network entity 105 may disable 175/1024 antennas, which corresponds to 17.1% of the antenna elements and corresponding power amplifiers. Thus, at a delay spread of 10 nanoseconds for this particular example, the power consumption of the power amplifiers at the network entity 105 may be reduced by 17.1% while reducing SNR of the received signal at the UE 115 by 0.549761 SNR. Accordingly, the power gain may depend on the delay spread (e.g., power consumption saving of 17.1% for a 10 nanosecond delay spread compared to a power consumption saving of 12.4% for a 20 nanosecond delay spread for similar antenna array loss thresholds.)

In some cases, the power amplifiers which may be disabled are the ones having a precoder power lower by a threshold value (e.g., 12.5 dB) as compared to a maximum precoder power level among all of the power amplifiers. As shown, for a similar antenna array loss, for different delay spread values, the network entity 105 may disable a different quantity of power amplifiers. Delay spread is a property of the channel between the UE 115 and the network entity, and the precoder is based on the estimated channel (e.g., based on CSI reporting), thus variations in delay spread affect the quantity of antennas that may be disabled. Further, channels with higher delay spread have higher variation in the frequency domain, and such channels with higher delay spread thus have corresponding higher precoder variation. With a higher precoder variation among the power amplifiers (e.g., among transmission chains) there is a higher probability of crossing the threshold power difference in any one power amplifier, thus leading to a smaller quantity of antennas that can be disabled (e.g., as less are likely to be lower than the maximum power input by the threshold amount).

Figure 4:
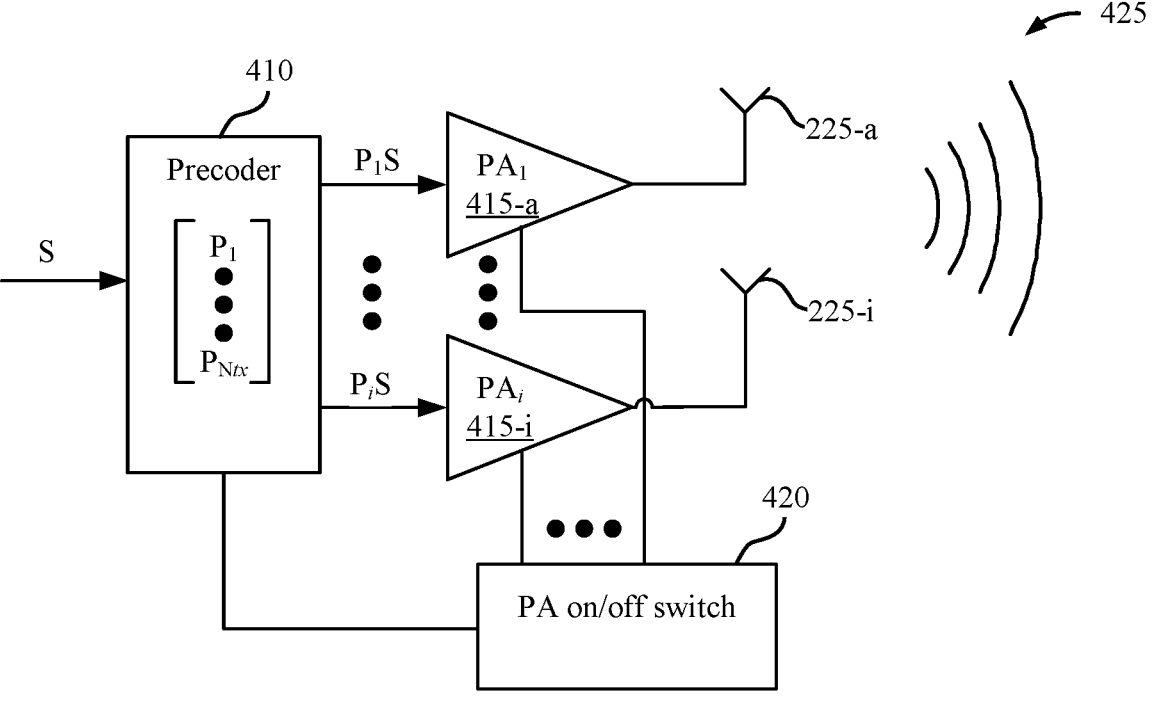
FIG. 4 shows an example of downlink transmission circuitry that supports power consumption savings based on channel delay spread reporting in accordance with one or more aspects of the present disclosure.

FIG. 4 shows an example of downlink transmission circuitry 400 that supports power consumption savings based on channel delay spread reporting in accordance with one or more aspects of the present disclosure. The downlink transmission circuitry 400 may implement or may be implemented by aspects of the wireless communication system 100 or the wireless communications system 200.

As described herein, a network entity 105 may encode a signal S for downlink transmission using a precoder 410 (e.g., an SVD precoder or other precoder with variable input power among different transmission chains). The precoded signal P may be input onto a set of multiple transmission chains including power amplifiers 415 (e.g., power amplifier 415-a through power amplifier 415-i) and corresponding antenna elements 225 (e.g., antenna element 225-a through antenna element 225-i). The amplified signal 425 may be transmitted to a UE 115 as described herein. The network entity 105 may disable one or more power amplifiers 415 based on delay spread and antenna array loss threshold reporting from a UE 115. For example, the network entity 105 may disable, using a power amplifier on/off switch 420, the transmission chains in which the input power of the precoded signal P is below a threshold, where the threshold is a determined based on the determined quantity of power amplifiers that may be disabled and the highest input power. For example, the threshold may be a threshold amount below the value of the highest input power. The same precoder 410 may be used with and without disabling power amplifiers via the power amplifier on/off switch 420, for example, based on feedback from a UE 115 regarding delay spread and/or antenna array loss threshold as described herein. For example, a first signal $S_0$ may be precoded using the precoder 410 and amplified using the power amplifiers 415 (e.g., power amplifier 415-a through power amplifier 415-i) without turning off any of the power amplifiers. Based on feedback from a UE 115 regarding delay spread and/or antenna array loss threshold for the signal $S_0$, the network entity 105 may encode the signal S and may disable one or more power amplifiers 415 using the power amplifier on/off switch 420.

Figure 5:
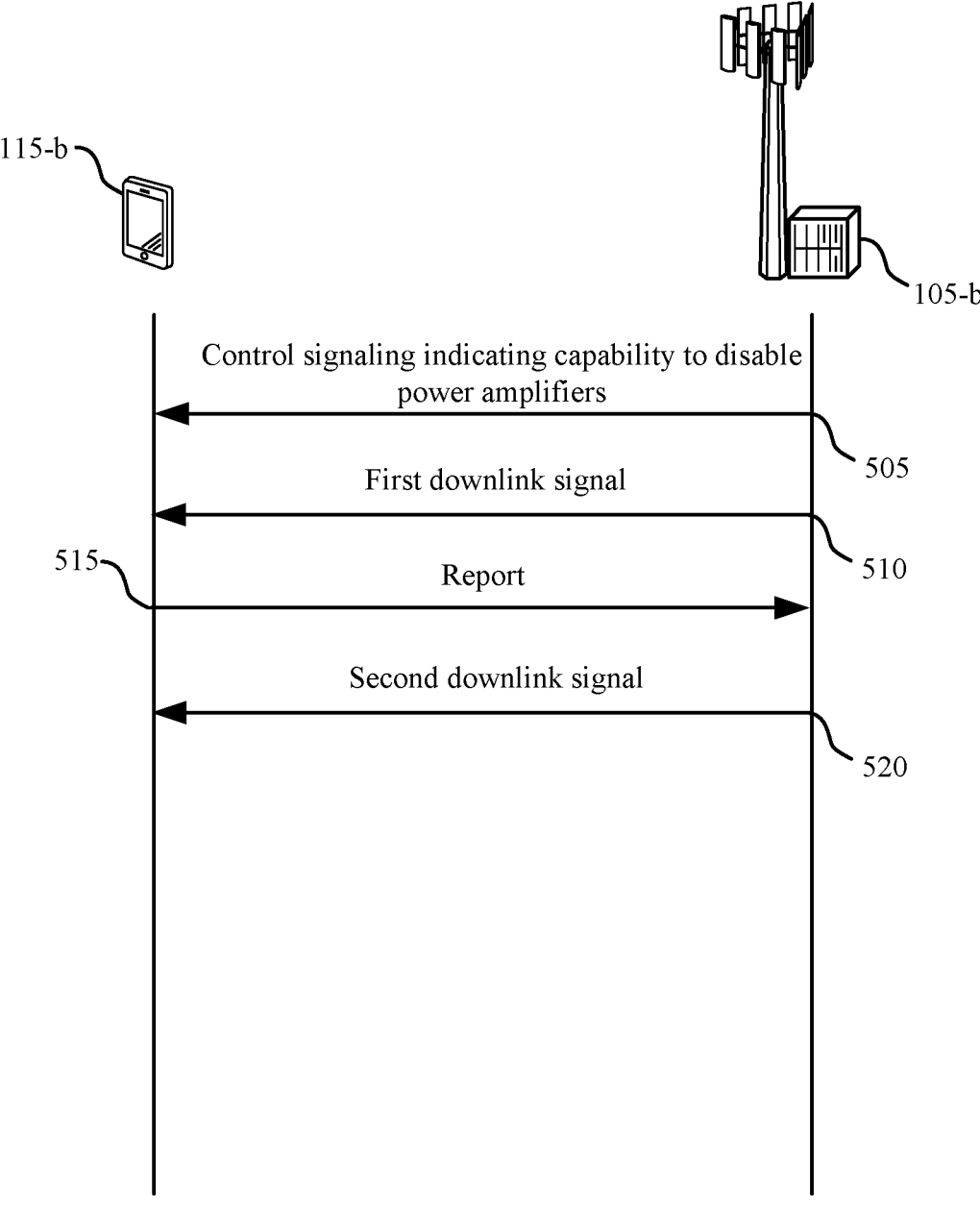
FIG. 5 shows an example of a process flow that supports power consumption savings based on channel delay spread reporting in accordance with one or more aspects of the present disclosure.

FIG. 5 shows an example of a process flow 500 that supports power consumption savings based on channel delay spread reporting in accordance with one or more aspects of the present disclosure. The process flow 500 may include a UE 115-b, which may be an example of a UE 115 as described herein. The process flow 500 may include a network entity 105-b, which may be an example of a network entity 105 as described herein. In the following description of the process flow 500, the operations between the network entity 105-b and the UE 115-b may be transmitted in a different order than the example order shown, or the operations performed by the network entity 105-*b* and the UE 115-*b* may be performed in different orders or at different times. Some operations may also be omitted from the process flow 500, and other operations may be added to the process flow 500.

At 505, the network entity 105-*b* may transmit, to the UE 115-*b*, control signaling indicating a capability of the network entity 105-*b* to disable one or more power amplifiers of a set of multiple power amplifiers of the network entity 105-*b*.

At 510, the network entity 105-*b* may transmit, to the UE 115-*b*, a first downlink signal using an MCS and a first quantity of power amplifiers of the set of multiple of power amplifiers. In some examples, the network entity 105-*b* may use a precoder for transmission of the first downlink signal. In some examples, the precoder may not uniformly distribute power among the transmission chains of the network entity 105-*b* (e.g., power amplifiers and antenna elements).

At 515, the UE 115-*b* may transmit, to the network entity 105-*b*, based on the control signaling, a report indicating an antenna array loss threshold and a channel delay spread measurement. The antenna array loss threshold and the channel delay spread measurement may be based on (e.g., estimated based on) the first downlink signal. In some examples, the antenna array loss threshold is based on a margin between a measured SNR of the first downlink signal at the UE 115-*b* and a threshold SNR. In some examples, the report may be transmitted via a UCI message or uplink control channel.

At 520, the network entity 105-*b* may transmit, to the UE 115-*b*, a second downlink signal using the MCS and a second quantity of power amplifiers of the plurality of power amplifiers. The second quantity may be different from the first quantity and the second quantity may be based on the report at 515. In some examples, the network entity 105-*b* may use the same precoder for transmission of the second downlink signal as the first downlink signal.

In some examples, the network entity 105-*b* may determine, based on the antenna array loss threshold and the channel delay spread measurement, a third quantity of power amplifiers of the plurality of power amplifiers to disable for the second downlink signal, where a difference between the first quantity and the second quantity is the third quantity. In some examples, the network entity 105-*b* may disable a set of power amplifiers of the set of multiple power amplifiers having respective input powers less than a threshold for the second downlink signal at 520, a quantity of power amplifiers of the set of power amplifiers being the third quantity. For example the threshold may be a threshold below a highest input power. In some examples, to determine the third quantity, the network entity 105-*b* may identify, based on the channel delay spread, a lookup table, and determine, based on the lookup table and the antenna array loss threshold, the third quantity.

In some examples, the network entity 105-*b* may receive, from the UE 115-*b* and based on the control signaling, a second report indicating a second antenna array loss threshold, or a second channel delay spread measurement, or both, where the channel delay spread measurement is a first channel delay spread measurement, where the antenna array loss threshold is a first antenna array loss threshold, and where the second antenna array loss threshold or the second channel delay spread measurement are based in part on the second downlink signal at 520.

In some examples, the control signaling at 505 may indicate the MCS. In some examples, the network entity 105-*b* may transmit a set of CSI-RSs to the UE 115-*b*, and the UE 115-*b* may transmit a CSI report to the network entity 105-*b* based on the CSI-RSs. In some examples, the MCS may be based on the CSI report. In some examples, the precoder used to transmit the first downlink signal and the second downlink signal may be based on the CSI report.

In some examples, the first downlink signal at 510 and the second downlink signal at 520 may be either downlink control channel transmissions or downlink shared channel transmissions.

Figure 6:
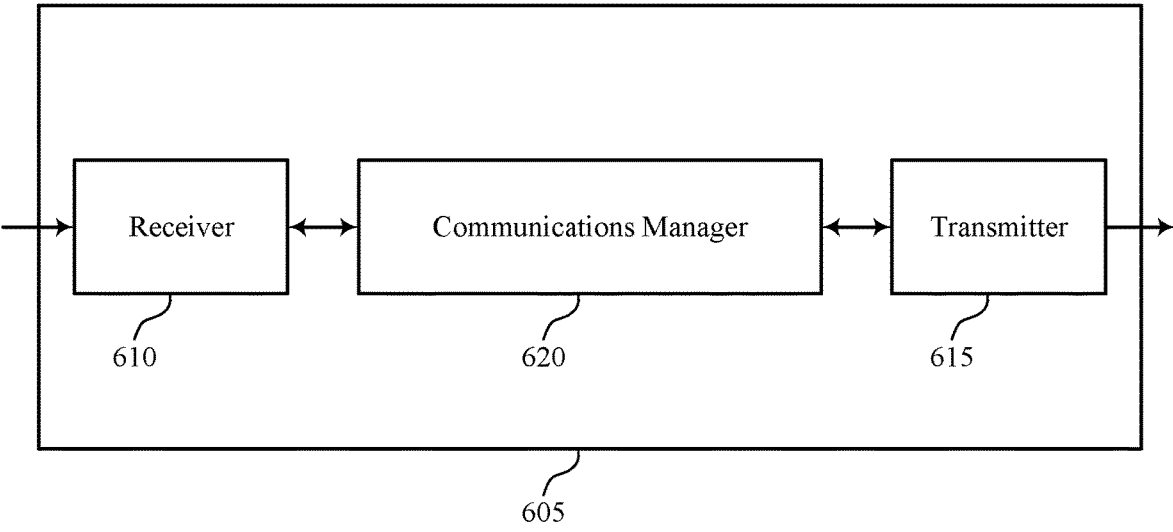
FIGS. 6 and 7 show block diagrams of devices that support power consumption savings based on channel delay spread reporting in accordance with one or more aspects of the present disclosure.

FIG. 6 shows a block diagram 600 of a device 605 that supports power consumption savings based on channel delay spread reporting in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to power consumption savings based on channel delay spread reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power consumption savings based on channel delay spread reporting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of power consumption savings based on channel delay spread reporting as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving, from a network entity, control signaling indicating a capability of the network entity to disable one or more power amplifiers of a set of multiple power amplifiers of the network entity. The communications manager 620 is capable of, configured to, or operable to support a means for receiving, from the network entity, a downlink signal transmitted using at least a subset of the set of multiple power amplifiers, the downlink signal associated with an MCS. The communications manager 620 is capable of, configured to, or operable to support a means for transmitting, to the network entity and based on the control signaling, a report indicating an antenna array loss threshold and a channel delay spread measurement, where the antenna array loss threshold and the channel delay spread measurement are determined based on the downlink signal and the MCS.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced power consumption and more efficient utilization of communication resources.

Figure 7:
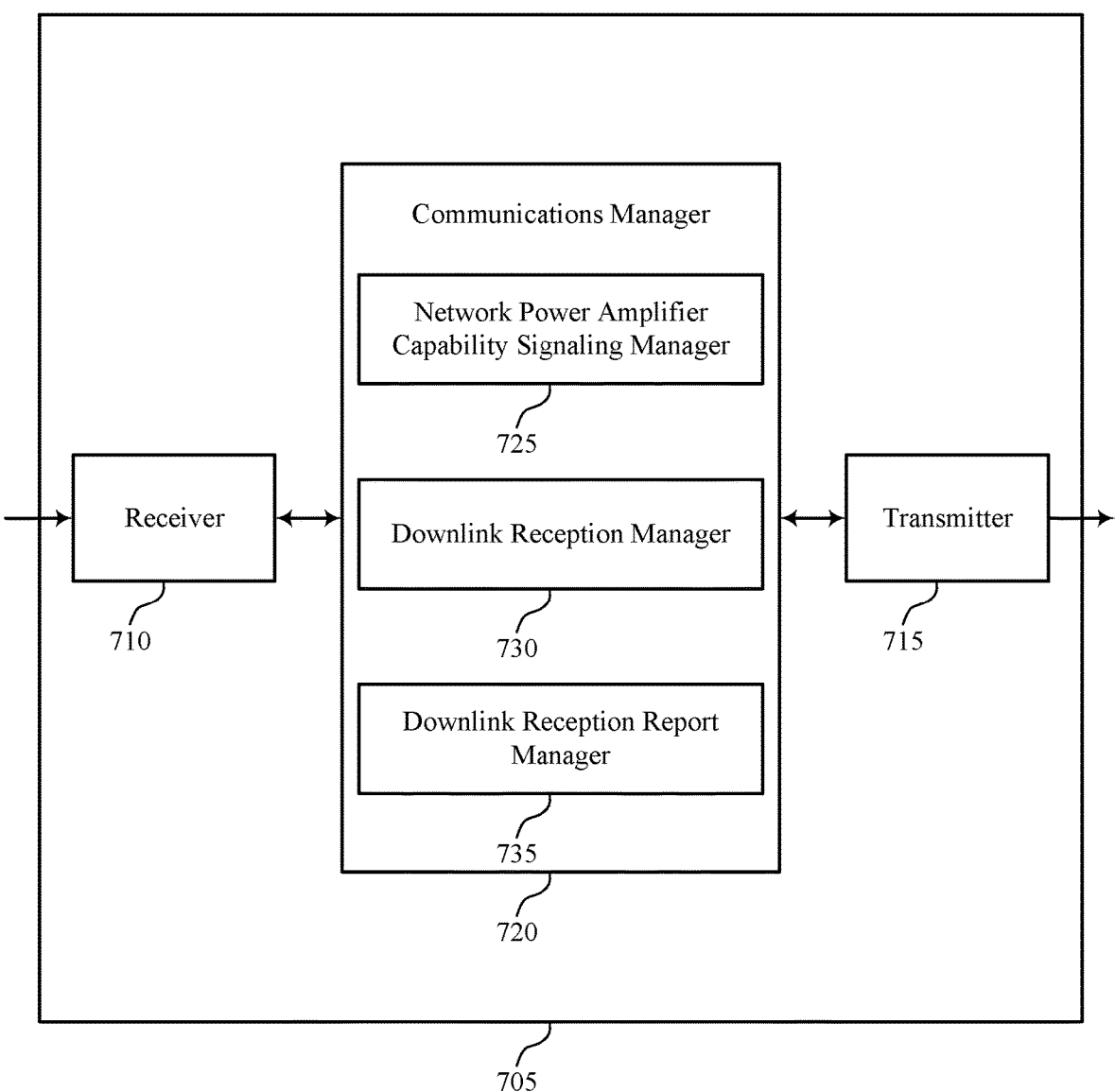

FIG. 7 shows a block diagram 700 of a device 705 that supports power consumption savings based on channel delay spread reporting in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to power consumption savings based on channel delay spread reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power consumption savings based on channel delay spread reporting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of power consumption savings based on channel delay spread reporting as described herein. For example, the communications manager 720 may include a network power amplifier capability signaling manager 725, a downlink reception manager 730, a downlink reception report manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The network power amplifier capability signaling manager 725 is capable of, configured to, or operable to support a means for receiving, from a network entity, control signaling indicating a capability of the network entity to disable one or more power amplifiers of a set of multiple power amplifiers of the network entity. The downlink reception manager 730 is capable of, configured to, or operable to support a means for receiving, from the network entity, a downlink signal transmitted using at least a subset of the set of multiple power amplifiers, the downlink signal associated with an MCS. The downlink reception report manager 735 is capable of, configured to, or operable to support a means for transmitting, to the network entity and based on the control signaling, a report indicating an antenna array loss threshold and a channel delay spread measurement, where the antenna array loss threshold and the channel delay spread measurement are determined based on the downlink signal and the MCS.

Figure 8:
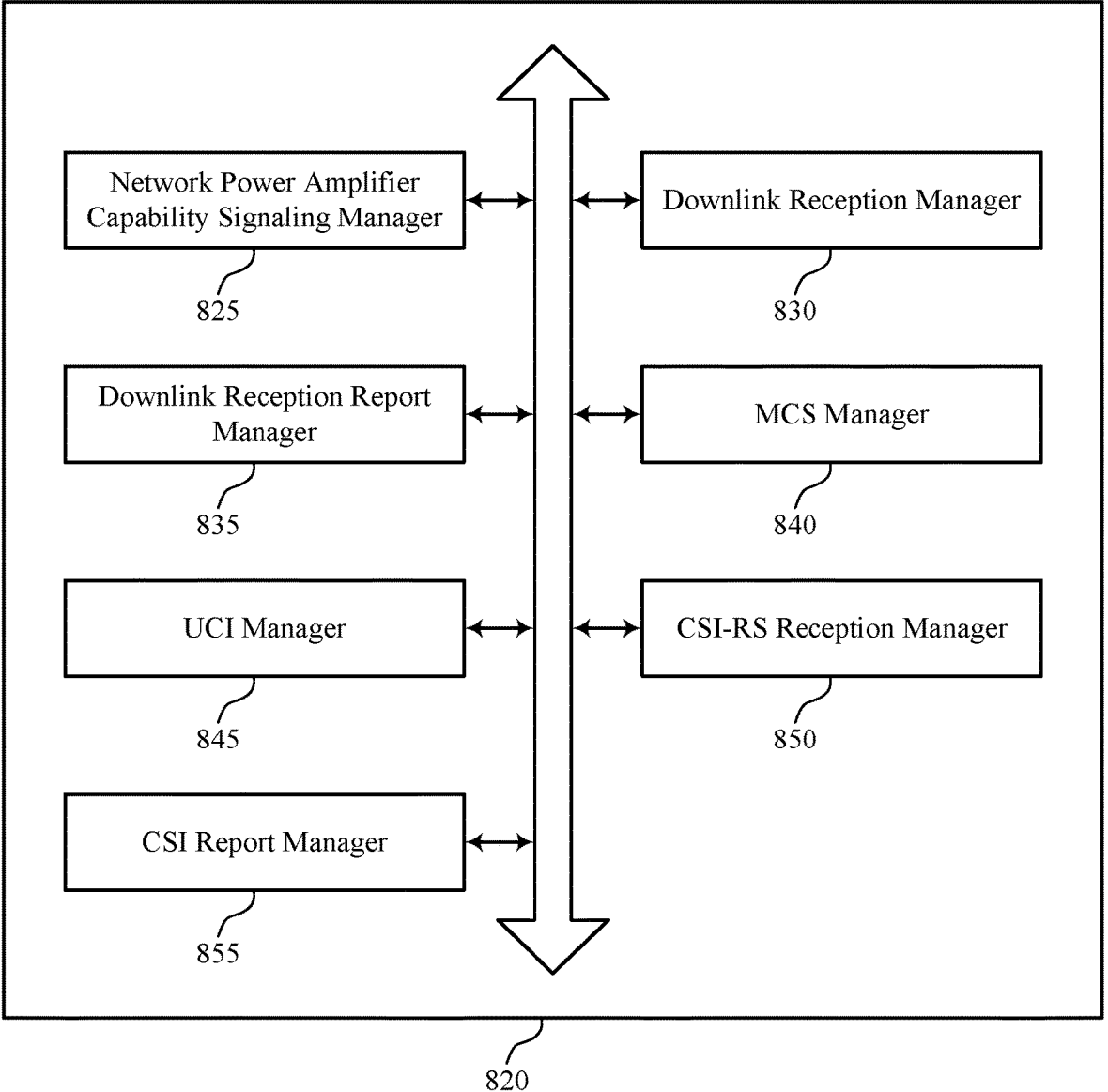
FIG. 8 shows a block diagram of a communications manager that supports power consumption savings based on channel delay spread reporting in accordance with one or more aspects of the present disclosure.

FIG. 8 shows a block diagram 800 of a communications manager 820 that supports power consumption savings based on channel delay spread reporting in accordance with one or more aspects of the present disclosure. The communications manager 820 may be an example of aspects of a communications manager 620, a communications manager 720, or both, as described herein. The communications manager 820, or various components thereof, may be an example of means for performing various aspects of power consumption savings based on channel delay spread reporting as described herein. For example, the communications manager 820 may include a network power amplifier capability signaling manager 825, a downlink reception manager 830, a downlink reception report manager 835, an MCS manager 840, a UCI manager 845, a CSI-RS reception manager 850, a CSI report manager 855, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The network power amplifier capability signaling manager 825 is capable of, configured to, or operable to support a means for receiving, from a network entity, control signaling indicating a capability of the network entity to disable one or more power amplifiers of a set of multiple power amplifiers of the network entity. The downlink reception manager 830 is capable of, configured to, or operable to support a means for receiving, from the network entity, a downlink signal transmitted using at least a subset of the set of multiple power amplifiers, the downlink signal associated with an MCS. The downlink reception report manager 835 is capable of, configured to, or operable to support a means for transmitting, to the network entity and based on the control signaling, a report indicating an antenna array loss threshold and a channel delay spread measurement, where the antenna array loss threshold and the channel delay spread measurement are determined based on the downlink signal and the MCS.

In some examples, the downlink signal is a first downlink signal, and the downlink reception manager 830 is capable of, configured to, or operable to support a means for receiving, from the network entity and subsequent to transmission of the report, a second downlink signal associated with the MCS, where a received signal power of the second downlink signal is based on the report.

In some examples, the downlink reception report manager 835 is capable of, configured to, or operable to support a means for transmitting, to the network entity and based on the control signaling, a second report indicating a second antenna array loss threshold and a second channel delay spread measurement, where the report includes a first report, where the channel delay spread measurement includes a first channel delay spread measurement, where the antenna array loss threshold includes a first antenna array loss threshold, and where the second antenna array loss threshold and the second channel delay spread measurement are determined based on the second downlink signal.

In some examples, the antenna array loss threshold is determined based on a margin between a measured SNR of the downlink signal and a threshold SNR.

In some examples, to support receiving the control signaling, the MCS manager 840 is capable of, configured to, or operable to support a means for receiving an indication of the MCS.

In some examples, the CSI-RS reception manager 850 is capable of, configured to, or operable to support a means for receiving, from the network entity, a set of CSI-RSs. In some examples, the CSI report manager 855 is capable of, configured to, or operable to support a means for transmitting, to the network entity, a CSI report based on the set of CSI-RSs, where the MCS is based on the CSI report.

In some examples, to support transmitting the report, the UCI manager 845 is capable of, configured to, or operable to support a means for transmitting the report via an uplink control channel transmission.

In some examples, the downlink signal is one of a downlink control channel transmission or a downlink shared channel transmission.

Figure 9:
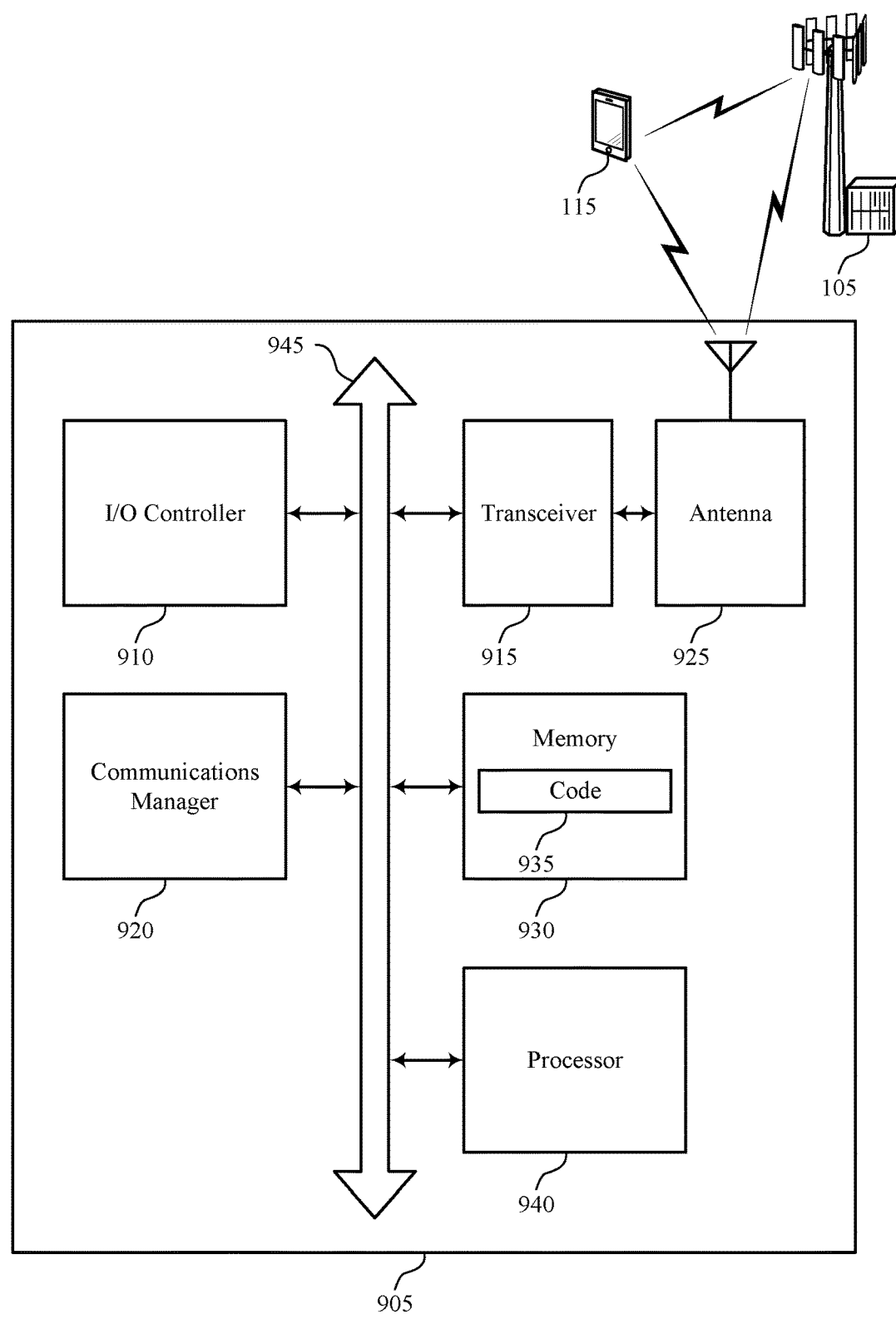
FIG. 9 shows a diagram of a system including a device that supports power consumption savings based on channel delay spread reporting in accordance with one or more aspects of the present disclosure.

FIG. 9 shows a diagram of a system 900 including a device 905 that supports power consumption savings based on channel delay spread reporting in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory.

In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting power consumption savings based on channel delay spread reporting). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving, from a network entity, control signaling indicating a capability of the network entity to disable one or more power amplifiers of a set of multiple power amplifiers of the network entity. The communications manager 920 is capable of, configured to, or operable to support a means for receiving, from the network entity, a downlink signal transmitted using at least a subset of the set of multiple power amplifiers, the downlink signal associated with an MCS. The communications manager 920 is capable of, configured to, or operable to support a means for transmitting, to the network entity and based on the control signaling, a report indicating an antenna array loss threshold and a channel delay spread measurement, where the antenna array loss threshold and the channel delay spread measurement are determined based on the downlink signal and the MCS.

By including or configuring the communications manager 920 in accordance with examples as described herein, the device 905 may support techniques for reduced power consumption, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of power consumption savings based on channel delay spread reporting as described herein, or the at least one processor 940 and the at least one memory 930 may be otherwise configured to, individually or collectively, perform or support such operations.

Figure 10:
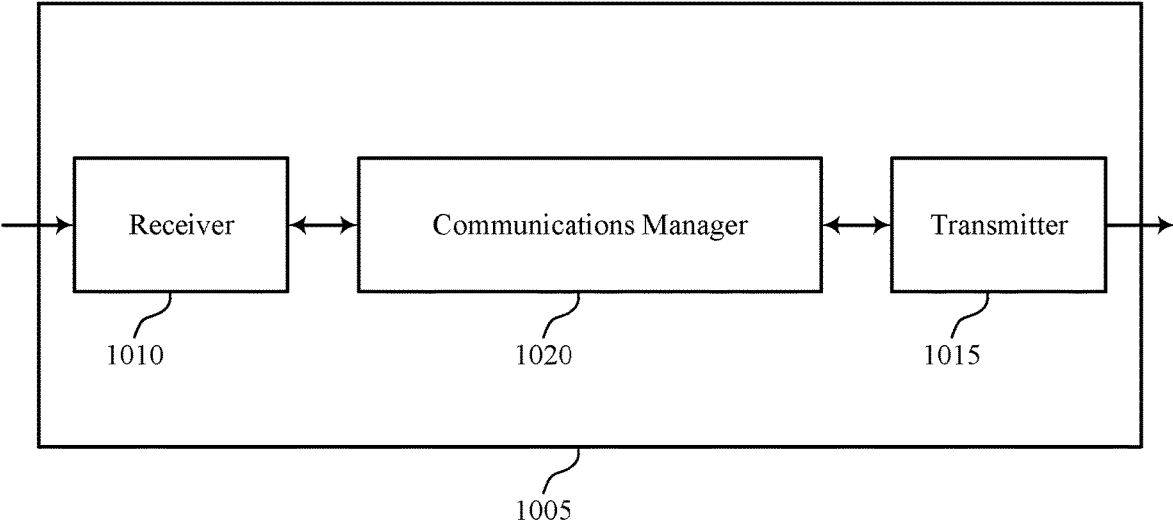
FIGS. 10 and 11 show block diagrams of devices that support power consumption savings based on channel delay spread reporting in accordance with one or more aspects of the present disclosure.

FIG. 10 shows a block diagram 1000 of a device 1005 that supports power consumption savings based on channel delay spread reporting in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of power consumption savings based on channel delay spread reporting as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, control signaling indicating a capability of the network entity to disable one or more power amplifiers of a set of multiple power amplifiers of the network entity. The communications manager 1020 is capable of, configured to, or operable to support a means for transmitting, to the UE, a first downlink signal using an MCS and a first quantity of power amplifiers of the set of multiple power amplifiers. The communications manager 1020 is capable of, configured to, or operable to support a means for receiving, from the UE and based on the control signaling, a report indicating an antenna array loss threshold and a channel delay spread measurement, where the antenna array loss threshold and the channel delay spread measurement are based on the first downlink signal. The communications manager 1020 is capable of, configured to, or operable to support a means for transmitting, to the UE, a second downlink signal using the MCS and a second quantity of power amplifiers of the set of multiple power amplifiers, where the second quantity different from the first quantity, and where the second quantity is based on the report.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced power consumption and more efficient utilization of communication resources.

Figure 11:
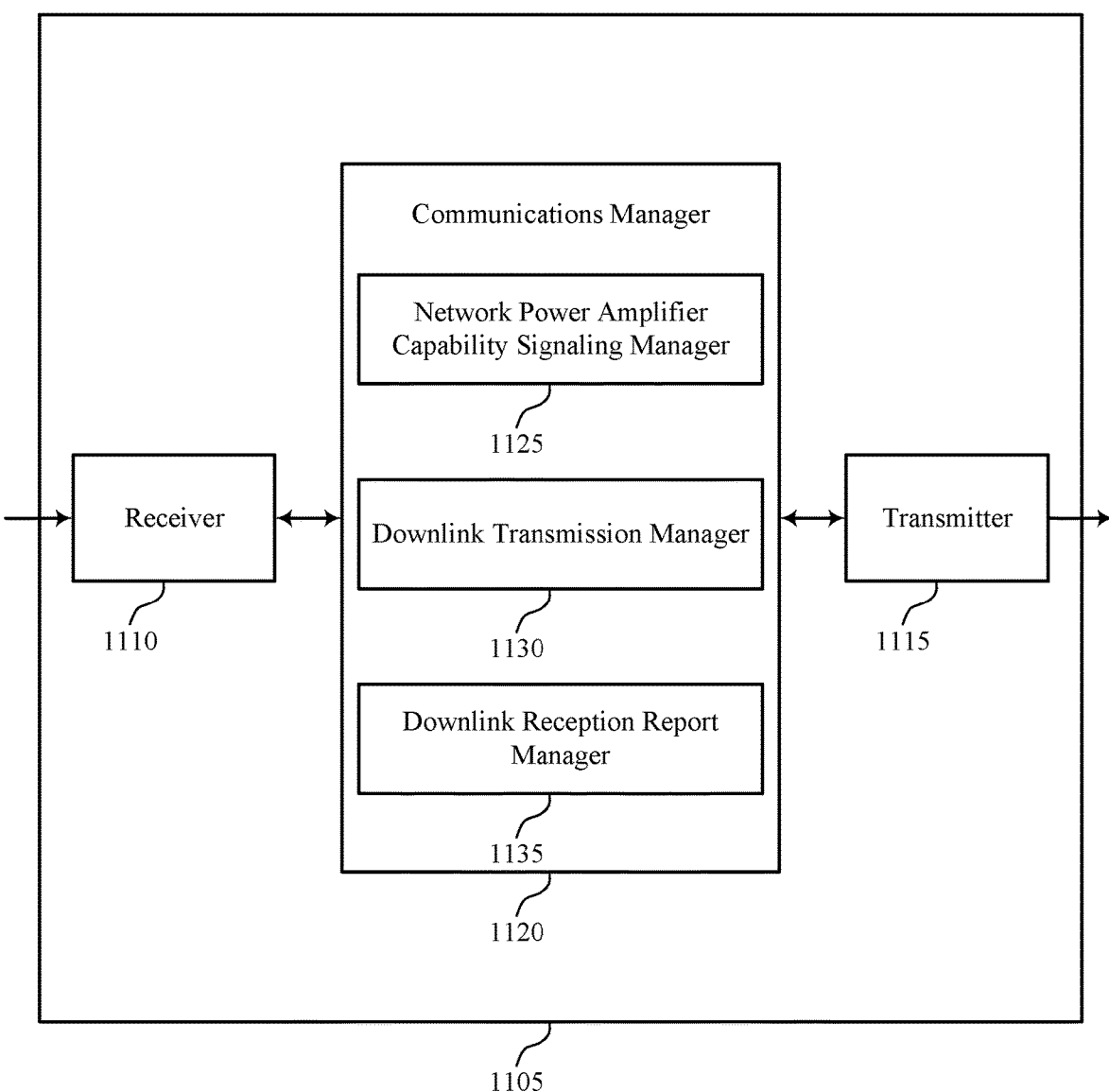

FIG. 11 shows a block diagram 1100 of a device 1105 that supports power consumption savings based on channel delay spread reporting in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of power consumption savings based on channel delay spread reporting as described herein. For example, the communications manager 1120 may include a network power amplifier capability signaling manager 1125, a downlink transmission manager 1130, a downlink reception report manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The network power amplifier capability signaling manager 1125 is capable of, configured to, or operable to support a means for transmitting, to a UE, control signaling indicating a capability of the network entity to disable one or more power amplifiers of a set of multiple power amplifiers of the network entity. The downlink transmission manager 1130 is capable of, configured to, or operable to support a means for transmitting, to the UE, a first downlink signal using an MCS and a first quantity of power amplifiers of the set of multiple power amplifiers. The downlink reception report manager 1135 is capable of, configured to, or operable to support a means for receiving, from the UE and based on the control signaling, a report indicating an antenna array loss threshold and a channel delay spread measurement, where the antenna array loss threshold and the channel delay spread measurement are based on the first downlink signal. The downlink transmission manager 1130 is capable of, configured to, or operable to support a means for transmitting, to the UE, a second downlink signal using the MCS and a second quantity of power amplifiers of the set of multiple power amplifiers, where the second quantity different from the first quantity, and where the second quantity is based on the report.

Figure 12:
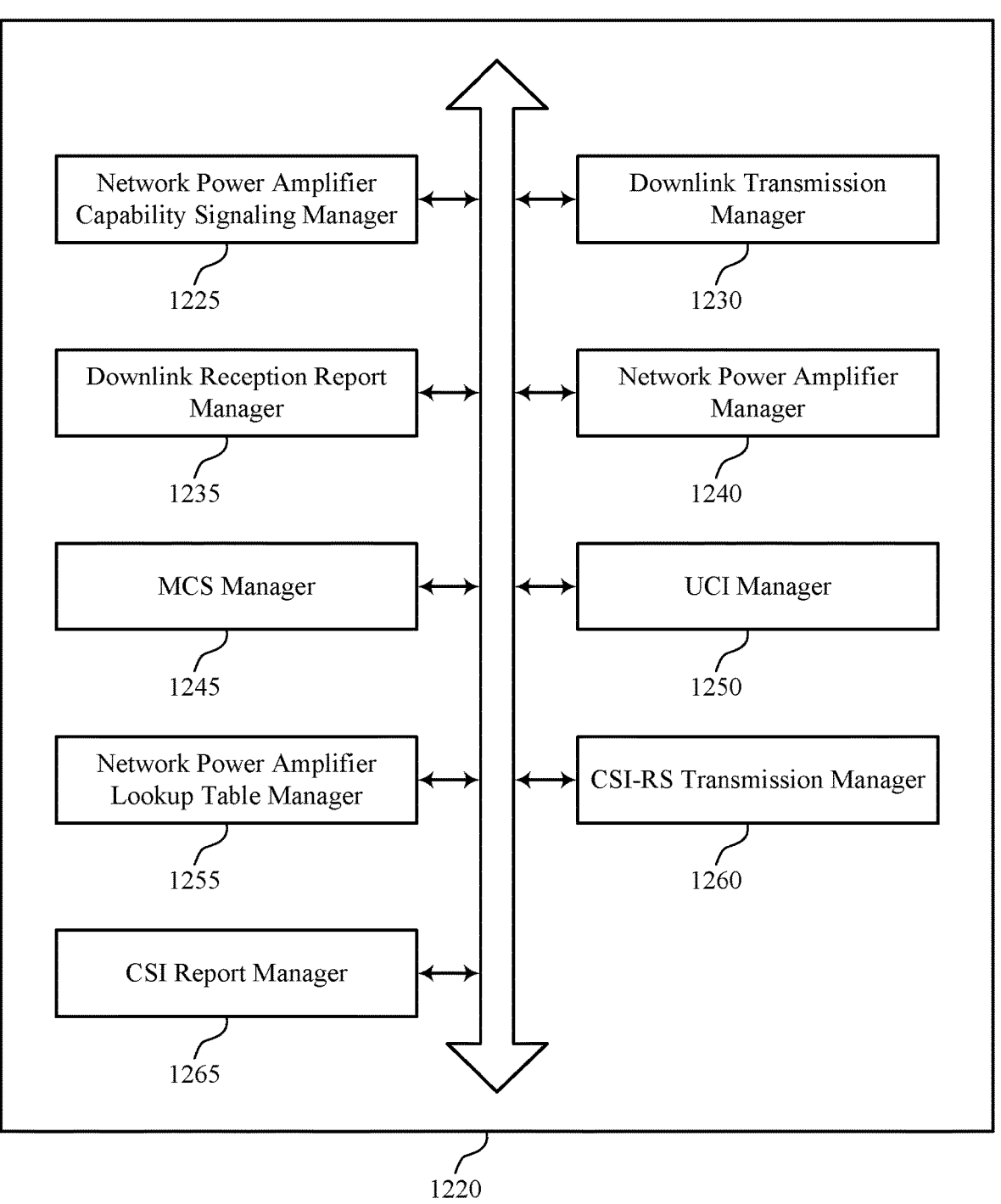
FIG. 12 shows a block diagram of a communications manager that supports power consumption savings based on channel delay spread reporting in accordance with one or more aspects of the present disclosure.

FIG. 12 shows a block diagram 1200 of a communications manager 1220 that supports power consumption savings based on channel delay spread reporting in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of power consumption savings based on channel delay spread reporting as described herein. For example, the communications manager 1220 may include a network power amplifier capability signaling manager 1225, a downlink transmission manager 1230, a downlink reception report manager 1235, a network power amplifier manager 1240, an MCS manager 1245, a UCI manager 1250, a network power amplifier lookup table manager 1255, a CSI-RS transmission manager 1260, a CSI report manager 1265, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The network power amplifier capability signaling manager 1225 is capable of, configured to, or operable to support a means for transmitting, to a UE, control signaling indicating a capability of the network entity to disable one or more power amplifiers of a set of multiple power amplifiers of the network entity. The downlink transmission manager 1230 is capable of, configured to, or operable to support a means for transmitting, to the UE, a first downlink signal using an MCS and a first quantity of power amplifiers of the set of multiple power amplifiers. The downlink reception report manager 1235 is capable of, configured to, or operable to support a means for receiving, from the UE and based on the control signaling, a report indicating an antenna array loss threshold and a channel delay spread measurement, where the antenna array loss threshold and the channel delay spread measurement are based on the first downlink signal. In some examples, the downlink transmission manager 1230 is capable of, configured to, or operable to support a means for transmitting, to the UE, a second downlink signal using the MCS and a second quantity of power amplifiers of the set of multiple power amplifiers, where the second quantity different from the first quantity, and where the second quantity is based on the report.

In some examples, the network power amplifier manager 1240 is capable of, configured to, or operable to support a means for determining, based on the antenna array loss threshold and the channel delay spread measurement, a third quantity of power amplifiers of the set of multiple power amplifiers to disable for the second downlink signal, where a difference between the first quantity and the second quantity is the third quantity.

In some examples, to support transmitting the second downlink signal, the network power amplifier manager 1240 is capable of, configured to, or operable to support a means for disabling a set of power amplifiers of the set of multiple power amplifiers having respective input powers less than a threshold for the second downlink signal, a quantity of power amplifiers of the set of power amplifiers being the third quantity.

In some examples, to support determining the third quantity, the network power amplifier lookup table manager 1255 is capable of, configured to, or operable to support a means for identifying, based on the channel delay spread measurement, a lookup table. In some examples, to support determining the third quantity, the network power amplifier manager 1240 is capable of, configured to, or operable to support a means for determining, based on the lookup table and the antenna array loss threshold, the third quantity.

In some examples, the downlink reception report manager 1235 is capable of, configured to, or operable to support a means for receiving, from the UE and based on the control signaling, a second report indicating a second antenna array loss threshold and a second channel delay spread measurement, where the channel delay spread measurement includes a first channel delay spread measurement, where the antenna array loss threshold includes a first antenna array loss threshold, and where the second antenna array loss threshold and the second channel delay spread measurement are based on the second downlink signal.

In some examples, the antenna array loss threshold is based on a margin between a measured SNR of the first downlink signal at the UE and a threshold SNR.

In some examples, to support transmitting the control signaling, the MCS manager 1245 is capable of, configured to, or operable to support a means for transmitting an indication of the MCS.

In some examples, the CSI-RS transmission manager 1260 is capable of, configured to, or operable to support a means for transmitting a set of CSI-RSs. In some examples, the CSI report manager 1265 is capable of, configured to, or operable to support a means for receiving, from the UE, a CSI report based on the set of CSI-RSs, where the MCS is based on the CSI report.

In some examples, to support receiving the report, the UCI manager 1250 is capable of, configured to, or operable to support a means for receiving the report via an uplink control channel transmission.

In some examples, the first downlink signal is one of a downlink control channel transmission or a downlink shared channel transmission.

Figure 13:
FIG. 13 shows a diagram of a system including a device that supports power consumption savings based on channel delay spread reporting in accordance with one or more aspects of the present disclosure.

FIG. 13 shows a diagram of a system 1300 including a device 1305 that supports power consumption savings based on channel delay spread reporting in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting power consumption savings based on channel delay spread reporting). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, control signaling indicating a capability of the network entity to disable one or more power amplifiers of a set of multiple power amplifiers of the network entity. The communications manager 1320 is capable of, configured to, or operable to support a means for transmitting, to the UE, a first downlink signal using an MCS and a first quantity of power amplifiers of the set of multiple power amplifiers. The communications manager 1320 is capable of, configured to, or operable to support a means for receiving, from the UE and based on the control signaling, a report indicating an antenna array loss threshold and a channel delay spread measurement, where the antenna array loss threshold and the channel delay spread measurement are based on the first downlink signal. The communications manager 1320 is capable of, configured to, or operable to support a means for transmitting, to the UE, a second downlink signal using the MCS and a second quantity of power amplifiers of the set of multiple power amplifiers, where the second quantity different from the first quantity, and where the second quantity is based on the report.

By including or configuring the communications manager 1320 in accordance with examples as described herein, the device 1305 may support techniques for reduced power consumption, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of power consumption savings based on channel delay spread reporting as described herein, or the at least one processor 1335 and the at least one memory 1325 may be otherwise configured to, individually or collectively, perform or support such operations.

FIG. 14 shows a flowchart illustrating a method 1400 that supports power consumption savings based on channel delay spread reporting in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, control signaling indicating a capability of the network entity to disable one or more power amplifiers of a set of multiple power amplifiers of the network entity. The operations of block 1405 may be performed in accordance with examples as disclosed herein. In some examples, aspects of the operations of 1405 may be performed by a network power amplifier capability signaling manager 825 as described with reference to FIG. 8.

At 1410, the method may include receiving, from the network entity, a downlink signal transmitted using at least a subset of the set of multiple power amplifiers, the downlink signal associated with an MCS. The operations of block 1410 may be performed in accordance with examples as disclosed herein. In some examples, aspects of the operations of 1410 may be performed by a downlink reception manager 830 as described with reference to FIG. 8.

At 1415, the method may include transmitting, to the network entity and based on the control signaling, a report indicating an antenna array loss threshold and a channel delay spread measurement, where the antenna array loss threshold and the channel delay spread measurement are determined based on the downlink signal and the MCS. The operations of block 1415 may be performed in accordance with examples as disclosed herein. In some examples, aspects of the operations of 1415 may be performed by a downlink reception report manager 835 as described with reference to FIG. 8.

FIG. 15 shows a flowchart illustrating a method 1500 that supports power consumption savings based on channel delay spread reporting in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, control signaling indicating a capability of the network entity to disable one or more power amplifiers of a set of multiple power amplifiers of the network entity. The operations of block 1505 may be performed in accordance with examples as disclosed herein. In some examples, aspects of the operations of 1505 may be performed by a network power amplifier capability signaling manager 1225 as described with reference to FIG. 12.

At 1510, the method may include transmitting, to the UE, a first downlink signal using an MCS and a first quantity of power amplifiers of the set of multiple power amplifiers. The operations of block 1510 may be performed in accordance with examples as disclosed herein. In some examples, aspects of the operations of 1510 may be performed by a downlink transmission manager 1230 as described with reference to FIG. 12.

At 1515, the method may include receiving, from the UE and based on the control signaling, a report indicating an antenna array loss threshold and a channel delay spread measurement, where the antenna array loss threshold and the channel delay spread measurement are based on the first downlink signal. The operations of block 1515 may be performed in accordance with examples as disclosed herein. In some examples, aspects of the operations of 1515 may be performed by a downlink reception report manager 1235 as described with reference to FIG. 12.

At 1520, the method may include transmitting, to the UE, a second downlink signal using the MCS and a second quantity of power amplifiers of the set of multiple power amplifiers, where the second quantity different from the first quantity, and where the second quantity is based on the report. The operations of block 1520 may be performed in accordance with examples as disclosed herein. In some examples, aspects of the operations of 1520 may be performed by a downlink transmission manager 1230 as described with reference to FIG. 12.

The following provides an overview of aspects of the present disclosure:

Aspect 1: A method for wireless communications at a UE, comprising: receiving, from a network entity, control signaling indicating a capability of the network entity to disable one or more power amplifiers of a plurality of power amplifiers of the network entity; receiving, from the network entity, a downlink signal transmitted using at least a subset of the plurality of power amplifiers, the downlink signal associated with an MCS; and transmitting, to the network entity and based at least in part on the control signaling, a report indicating an antenna array loss threshold and a channel delay spread measurement, wherein the antenna array loss threshold and the channel delay spread measurement are determined based at least in part on the downlink signal and the MCS.

Aspect 2: The method of aspect 1, wherein the downlink signal is a first downlink signal, the method further comprising: receiving, from the network entity and subsequent to transmission of the report, a second downlink signal associated with the MCS, wherein a received signal power of the second downlink signal is based at least in part on the report.

Aspect 3: The method of aspect 2, the further comprising: transmitting, to the network entity and based at least in part on the control signaling, a second report indicating a second antenna array loss threshold and a second channel delay spread measurement, wherein the report comprises a first report, wherein the channel delay spread measurement comprises a first channel delay spread measurement, wherein the antenna array loss threshold comprises a first antenna array loss threshold, and wherein the second antenna array loss threshold and the second channel delay spread measurement are determined based at least in part on the second downlink signal.

Aspect 4: The method of any of aspects 1 through 3, wherein the antenna array loss threshold is determined based at least in part on a margin between a measured SNR of the downlink signal and a threshold SNR.

Aspect 5: The method of any of aspects 1 through 4, wherein receiving the control signaling comprises: receiving an indication of the MCS.

Aspect 6: The method of aspect 5, further comprising: receiving, from the network entity, a set of CSI-RSs; and transmitting, to the network entity, a CSI report based at least in part on the set of CSI-RSs, wherein the MCS is based at least in part on the CSI report.

Aspect 7: The method of any of aspects 1 through 6, wherein transmitting the report comprises: transmitting the report via an uplink control channel transmission.

Aspect 8: The method of any of aspects 1 through 7, wherein the downlink signal is one of a downlink control channel transmission or a downlink shared channel transmission.

Aspect 9: A method for wireless communications at a network entity, comprising: transmitting, to a UE, control signaling indicating a capability of the network entity to disable one or more power amplifiers of a plurality of power amplifiers of the network entity; transmitting, to the UE, a first downlink signal using an MCS and a first quantity of power amplifiers of the plurality of power amplifiers; receiving, from the UE and based at least in part on the control signaling, a report indicating an antenna array loss threshold and a channel delay spread measurement, wherein the antenna array loss threshold and the channel delay spread measurement are based at least in part on the first downlink signal; and transmitting, to the UE, a second downlink signal using the MCS and a second quantity of power amplifiers of the plurality of power amplifiers, wherein the second quantity different from the first quantity, and wherein the second quantity is based at least in part on the report.

Aspect 10: The method of aspect 9, further comprising: determining, based at least in part on the antenna array loss threshold and the channel delay spread measurement, a third quantity of power amplifiers of the plurality of power amplifiers to disable for the second downlink signal, wherein a difference between the first quantity and the second quantity is the third quantity.

Aspect 11: The method of aspect 10, wherein transmitting the second downlink signal comprises: disabling a set of power amplifiers of the plurality of power amplifiers having respective input powers less than a threshold for the second downlink signal, a quantity of power amplifiers of the set of power amplifiers being the third quantity.

Aspect 12: The method of any of aspects 10 through 11, wherein determining the third quantity comprises: identifying, based at least in part on the channel delay spread measurement, a lookup table; and determining, based at least in part on the lookup table and the antenna array loss threshold, the third quantity.

Aspect 13: The method of any of aspects 9 through 12, further comprising: receiving, from the UE and based at least in part on the control signaling, a second report indicating a second antenna array loss threshold and a second channel delay spread measurement, wherein the channel delay spread measurement comprises a first channel delay spread measurement, wherein the antenna array loss threshold comprises a first antenna array loss threshold, and wherein the second antenna array loss threshold and the second channel delay spread measurement are based at least in part on the second downlink signal.

Aspect 14: The method of any of aspects 9 through 13, wherein the antenna array loss threshold is based at least in part on a margin between a measured SNR of the first downlink signal at the UE and a threshold SNR.

Aspect 15: The method of any of aspects 9 through 14, wherein transmitting the control signaling comprises: transmitting an indication of the MCS.

Aspect 16: The method of aspect 15, further comprising: transmitting a set of CSI-RSs; and receiving, from the UE, a CSI report based at least in part on the set of CSI-RSs, wherein the MCS is based at least in part on the CSI report.

Aspect 17: The method of any of aspects 9 through 16, wherein receiving the report comprises: receiving the report via an uplink control channel transmission.

Aspect 18: The method of any of aspects 9 through 17, wherein the first downlink signal is one of a downlink control channel transmission or a downlink shared channel transmission.

Aspect 19: A UE for wireless communications, comprising one or more memories storing processor-executable code, and one or more processors coupled with the one or more memories and individually or collectively operable to execute the code to cause the UE to perform a method of any of aspects 1 through 8.

Aspect 20: A UE for wireless communications, comprising at least one means for performing a method of any of aspects 1 through 8.

Aspect 21: A non-transitory computer-readable medium storing code for wireless communications, the code comprising instructions executable by a processor to perform a method of any of aspects 1 through 8.

Aspect 22: A network entity for wireless communications, comprising one or more memories storing processor-executable code, and one or more processors coupled with the one or more memories and individually or collectively operable to execute the code to cause the network entity to perform a method of any of aspects 9 through 18.

Aspect 23: A network entity for wireless communications, comprising at least one means for performing a method of any of aspects 9 through 18.

Aspect 24: A non-transitory computer-readable medium storing code for wireless communications, the code comprising instructions executable by a processor to perform a method of any of aspects 9 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a network entity, control signaling indicating a capability of the network entity to disable one or more power amplifiers of a plurality of power amplifiers of the network entity;
receive, from the network entity, a downlink signal transmitted using at least a subset of the plurality of power amplifiers, the downlink signal associated with a modulation and coding scheme; and
transmit, to the network entity and based at least in part on the control signaling, a report indicating an antenna array loss threshold and a channel delay spread measurement, wherein the antenna array loss threshold and the channel delay spread measurement are determined based at least in part on the downlink signal and the modulation and coding scheme.

2. The UE of claim 1, wherein the downlink signal is a first downlink signal, and the one or more processors are individually or collectively further operable to execute the code to cause the UE to:

receive, from the network entity and subsequent to transmission of the report, a second downlink signal associated with the modulation and coding scheme, wherein a received signal power of the second downlink signal is based at least in part on the report.

3. The UE of claim 2, wherein the one or more processors are individually or collectively further operable to execute the code to cause the UE to:

transmit, to the network entity and based at least in part on the control signaling, a second report indicating a second antenna array loss threshold and a second channel delay spread measurement, wherein the report comprises a first report, wherein the channel delay spread measurement comprises a first channel delay spread measurement, wherein the antenna array loss threshold comprises a first antenna array loss threshold, and wherein the second antenna array loss threshold and the second channel delay spread measurement are determined based at least in part on the second downlink signal.

4. The UE of claim 1, wherein the antenna array loss threshold is determined based at least in part on a margin between a measured signal to noise ratio of the downlink signal and a threshold signal to noise ratio.

5. The UE of claim 1, wherein, to receive the control signaling, the one or more processors are individually or collectively operable to execute the code to cause the UE to:

receive an indication of the modulation and coding scheme.

6. The UE of claim 5, wherein the one or more processors are individually or collectively further operable to execute the code to cause the UE to:

receive, from the network entity, a set of channel state information reference signals; and transmit, to the network entity, a channel state information report based at least in part on the set of channel state information reference signals, wherein the modulation and coding scheme is based at least in part on the channel state information report.

7. The UE of claim 1, wherein, to transmit the report, the one or more processors are individually or collectively operable to execute the code to cause the UE to:

transmit the report via an uplink control channel transmission.

8. The UE of claim 1, wherein the downlink signal is one of a downlink control channel transmission or a downlink shared channel transmission.

9. A network entity, comprising:

one or more memories storing processor-executable code; and one or more processors coupled with the one or more memories and individually or collectively operable to execute the code to cause the network entity to:

transmit, to a user equipment (UE), control signaling indicating a capability of the network entity to disable one or more power amplifiers of a plurality of power amplifiers of the network entity;

transmit, to the UE, a first downlink signal using a modulation and coding scheme and a first quantity of power amplifiers of the plurality of power amplifiers;

receive, from the UE and based at least in part on the control signaling, a report indicating an antenna array loss threshold and a channel delay spread measurement, wherein the antenna array loss threshold and the channel delay spread measurement are based at least in part on the first downlink signal; and transmit, to the UE, a second downlink signal using the modulation and coding scheme and a second quantity of power amplifiers of the plurality of power amplifiers, wherein the second quantity different from the first quantity, and wherein the second quantity is based at least in part on the report.

10. The network entity of claim 9, wherein the one or more processors are individually or collectively further operable to execute the code to cause the network entity to:

determine, based at least in part on the antenna array loss threshold and the channel delay spread measurement, a third quantity of power amplifiers of the plurality of power amplifiers to disable for the second downlink signal, wherein a difference between the first quantity and the second quantity is the third quantity.

11. The network entity of claim 10, wherein, to transmit the second downlink signal, the one or more processors are individually or collectively operable to execute the code to cause the network entity to:

disable a set of power amplifiers of the plurality of power amplifiers having respective input powers less than a threshold for the second downlink signal, a quantity of power amplifiers of the set of power amplifiers being the third quantity.

12. The network entity of claim 10, wherein, to determine the third quantity, the one or more processors are individually or collectively operable to execute the code to cause the network entity to:

identifying, based at least in part on the channel delay spread measurement, a lookup table; and determine, based at least in part on the lookup table and the antenna array loss threshold, the third quantity.

13. The network entity of claim 9, wherein the one or more processors are individually or collectively further operable to execute the code to cause the network entity to:

receive, from the UE and based at least in part on the control signaling, a second report indicating a second antenna array loss threshold and a second channel delay spread measurement, wherein the channel delay spread measurement comprises a first channel delay spread measurement, wherein the antenna array loss threshold comprises a first antenna array loss threshold, and wherein the second antenna array loss threshold and the second channel delay spread measurement are based at least in part on the second downlink signal.

14. The network entity of claim 9, wherein the antenna array loss threshold is based at least in part on a margin between a measured signal to noise ratio of the first downlink signal at the UE and a threshold signal to noise ratio.

15. The network entity of claim 9, wherein, to transmit the control signaling, the one or more processors are individually or collectively operable to execute the code to cause the network entity to:

transmit an indication of the modulation and coding scheme.

16. The network entity of claim 15, wherein the one or more processors are individually or collectively further operable to execute the code to cause the network entity to:

transmit a set of channel state information reference signals; and receive, from the UE, a channel state information report based at least in part on the set of channel state information reference signals, wherein the modulation and coding scheme is based at least in part on the channel state information report.

17. The network entity of claim 9, wherein, to receive the report, the one or more processors are individually or collectively operable to execute the code to cause the network entity to:

receive the report via an uplink control channel transmission.

18. The network entity of claim 9, wherein the first downlink signal is one of a downlink control channel transmission or a downlink shared channel transmission.

19. A method for wireless communications at a user equipment (UE), comprising:

receiving, from a network entity, control signaling indicating a capability of the network entity to disable one or more power amplifiers of a plurality of power amplifiers of the network entity;

receiving, from the network entity, a downlink signal transmitted using at least a subset of the plurality of power amplifiers, the downlink signal associated with a modulation and coding scheme; and transmitting, to the network entity and based at least in part on the control signaling, a report indicating an antenna array loss threshold and a channel delay spread measurement, wherein the antenna array loss threshold and the channel delay spread measurement are determined based at least in part on the downlink signal and the modulation and coding scheme.

20. The method of claim 19, wherein the downlink signal is a first downlink signal, the method further comprising:

receiving, from the network entity and subsequent to transmission of the report, a second downlink signal associated with the modulation and coding scheme, wherein a received signal power of the second downlink signal is based at least in part on the report.

21. The method of claim 20, further comprising:

transmitting, to the network entity and based at least in part on the control signaling, a second report indicating a second antenna array loss threshold and a second channel delay spread measurement, wherein the report comprises a first report, wherein the channel delay spread measurement comprises a first channel delay spread measurement, wherein the antenna array loss threshold comprises a first antenna array loss threshold, and wherein the second antenna array loss threshold and the second channel delay spread measurement are determined based at least in part on the second downlink signal.

22. The method of claim 19, wherein the antenna array loss threshold is determined based at least in part on a margin between a measured signal to noise ratio of the downlink signal and a threshold signal to noise ratio.

23. The method of claim 19, wherein receiving the control signaling comprises:

receiving an indication of the modulation and coding scheme.

24. The method of claim 23, further comprising:

receiving, from the network entity, a set of channel state information reference signals; and transmitting, to the network entity, a channel state information report based at least in part on the set of channel state information reference signals, wherein the modulation and coding scheme is based at least in part on the channel state information report.

25. The method of claim 19, wherein transmitting the report comprises:

transmitting the report via an uplink control channel transmission.

26. The method of claim 19, wherein the downlink signal is one of a downlink control channel transmission or a downlink shared channel transmission.

27. A method for wireless communications at a network entity, comprising:

transmitting, to a user equipment (UE), control signaling indicating a capability of the network entity to disable one or more power amplifiers of a plurality of power amplifiers of the network entity;

transmitting, to the UE, a first downlink signal using a modulation and coding scheme and a first quantity of power amplifiers of the plurality of power amplifiers;

receiving, from the UE and based at least in part on the control signaling, a report indicating an antenna array loss threshold and a channel delay spread measurement, wherein the antenna array loss threshold and the channel delay spread measurement are based at least in part on the first downlink signal; and transmitting, to the UE, a second downlink signal using the modulation and coding scheme and a second quantity of power amplifiers of the plurality of power amplifiers, wherein the second quantity different from the first quantity, and wherein the second quantity is based at least in part on the report.

28. The method of claim 27, further comprising:

determining, based at least in part on the antenna array loss threshold and the channel delay spread measurement, a third quantity of power amplifiers of the plurality of power amplifiers to disable for the second downlink signal, wherein a difference between the first quantity and the second quantity is the third quantity.

29. The method of claim 28, wherein transmitting the second downlink signal comprises:

disabling a set of power amplifiers of the plurality of power amplifiers having respective input powers less than a threshold for the second downlink signal, a quantity of power amplifiers of the set of power amplifiers being the third quantity.

30. The method of claim 28, wherein determining the third quantity comprises:

identifying, based at least in part on the channel delay spread measurement, a lookup table; and determining, based at least in part on the lookup table and the antenna array loss threshold, the third quantity.

* * * * *